(12) United States Patent
Sun et al.

(10) Patent No.: US 11,115,876 B2
(45) Date of Patent: Sep. 7, 2021

(54) SERVICE CONTINUITY IMPLEMENTATION METHOD, DEVICE, AND SERVICE CONTINUITY IMPLEMENTATION SYSTEM

(71) Applicant: Huawei Technologies Co., Ltd., Shenzhen (CN)

(72) Inventors: Dekui Sun, Shenzhen (CN); Han Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 60 days.

(21) Appl. No.: 16/716,049

(22) Filed: Dec. 16, 2019

(65) Prior Publication Data
US 2020/0120549 A1 Apr. 16, 2020

Related U.S. Application Data

(63) Continuation of application No. PCT/CN2017/089859, filed on Jun. 23, 2017.

(51) Int. Cl.
*H04W 36/00* (2009.01)
*H04W 36/12* (2009.01)

(52) U.S. Cl.
CPC ....... *H04W 36/0016* (2013.01); *H04W 36/12* (2013.01)

(58) Field of Classification Search
CPC ......... H04W 36/0016; H04W 28/0226; H04W 40/36; H04W 36/12
See application file for complete search history.

(56) References Cited

U.S. PATENT DOCUMENTS

2013/0028172 A1  1/2013 Lim et al.
2015/0180945 A1*  6/2015 Hall ........................ H04W 4/20
                                              709/203
(Continued)

FOREIGN PATENT DOCUMENTS

CN  106331200 A  1/2017
CN  106488504 A  3/2017
(Continued)

OTHER PUBLICATIONS

Huawei, et al., "Solution for key issue 6: Co-ordination the Session and Service Continuity with the Application-aware UP Path (Re)selection," S2-164628, SA WG2 Meeting #116b, Aug. 29-Sep. 2, 2016, Sanya, P.R., China, 4 pages.
(Continued)

*Primary Examiner* — Rafael Pérez-Gutiérrez
*Assistant Examiner* — Xiang Zhang
(74) *Attorney, Agent, or Firm* — Conley Rose, P.C.

(57) ABSTRACT

A service continuity implementation method, a device, and a service continuity implementation system, to ensure service continuity in a handover process, where the method includes: selecting, by a session management function entity, a target user plane function entity to serve a terminal; sending, by the session management function entity, a first message to a control device; receiving, by the session management function entity, indication information of a first application server (AS) from the control device; and sending, by the session management function entity, a first routing rule to the target user plane function entity based on the indication information of the first AS, where the first routing rule specifies that data whose destination address is an address of the first AS is to be sent to the first AS.

19 Claims, 14 Drawing Sheets

(56) References Cited

U.S. PATENT DOCUMENTS

2018/0192429 A1 7/2018 Yang
2019/0313479 A1* 10/2019 Myhre .................. H04W 80/12

FOREIGN PATENT DOCUMENTS

| EP | 3 585 107 A1 * | 12/2019 | ............ H04W 76/15 |
|---|---|---|---|
| WO | 2016202363 A1 | 12/2016 | |
| WO | 2017045643 A1 | 3/2017 | |

OTHER PUBLICATIONS

Samsung, "TS 23.502: P-CR on UPF relocation procedure for SSC mode 2 and 3," S2-171079, SA WG2 Meeting #119, Feb. 13-17, 2017, Dubrovnik, Croatia, 3 pages.

S2-170353, Nokia, et al., "23.501: Introducing SSC mode and UPF Selection," SA WG2 Meeting #118BIS, Jan. 16-20, 2017, Spokane, Washington, USA, 4 pages.

Nokia., et al., "TS 23.502: Handover procedure correction for UPF relocation", S2-173155, SA WG2 Meeting #121, May 15-19, 2017, Hangzhou, China. 10 pages.

Samsung, "23.502: Update of handover without Xn interface", S2-173265, SA WG2 Meeting #121, May 15-19, 2017 Hangzhou, P.R. China, 5 pages.

3GPP TS 22.186 V15.1.0, "3rd Generation Partnership Project;Technical Specification Group Services and System Aspects;Enhancement of 3GPP support for V2X scenarios:Stage 1(Release 15)," Jun. 16, 2017, 16 pages.

SP-170384_S2-174079_Cover Sheet for TS 23501 SA WG2, "Presentation of TR 23.501: System Architecture for the 5G System (Release 15) to TSG SA for Approval", 3GPP TSG SA Meeting #76, Jun. 7-9, 2017, West Palm Beach, Florida, USA, 2 pages.

3GPP TS 23.501 V1.0.0, "3rd Generation Partnership Project;Technical Specification Group Services and System Aspects; System Architecture for the 5G System; Stage 2 (Release 15)," Jun. 1, 2017, 146 pages.

3GPP TS 23.502 V0.4.0, "3rd Generation Partnership Project; Technical Specification Group Services and System Aspects; Procedures for the 5G System; Stage 2 (Release 15)," May 2017, 126 pages.

Huawei, et al., "Application-influenced SSC and UP management," 3GPP TSG SA WG2 #119, S2-171066, Feb. 7, 2017, 10 pages.

Huawei, et al., "Application-friendly UP Management," 3GPP TSG SA WG2 #118bis, S2-170370, Jan. 23, 2017, 14 pages.

Huawei, et al., "Update of Solution 6.5.5: Application-aware UP Path (Re)selection," 3GPP TSG SA WG2 #116bis, S2-165152, Sep. 3, 2016, 5 pages.

3GPP TR 23.799 V14.0.0 (Dec. 2016), "3rd Generation Partnership Project; Technical Specification Group Services and System Aspects; Study on Architecture for Next Generation System (Release 14)," 9 pages.

* cited by examiner

US 11,115,876 B2

SERVICE CONTINUITY IMPLEMENTATION METHOD, DEVICE, AND SERVICE CONTINUITY IMPLEMENTATION SYSTEM

CROSS-REFERENCE TO RELATED APPLICATIONS

This application is a continuation of International Patent Application No. PCT/CN2017/089859, filed on Jun. 23, 2017, the disclosure of which is hereby incorporated by reference in its entirety.

TECHNICAL FIELD

This application relates to the field of communications technologies, and in particular, to a service continuity implementation method, a device, and a service continuity implementation system.

BACKGROUND

To meet challenges of wireless broadband technologies and retain leading-edge advantages of 3rd generation partnership project (3GPP) networks, the 3GPP standard organization formulated a network architecture of a next generation mobile communications system by the end of 2016, which is referred to as a 5th generation (5G) network architecture.

In the 5G network architecture, an ultra-reliable low-latency communication (URLLC) scenario is defined, and mainly includes services such as self-driving and industrial automation that require a low-latency and high-reliable connection. For example, the existing 5G technical specification (TS) 22.186 specifies that in a remote driving scenario, end-to-end latency between a terminal and a server needs to be always less than 5 ms. To meet an end-to-end latency requirement, an application server (AS) needs to be deployed locally. In addition, if the terminal moves at a high speed, a handover of a user plane function (UPF) entity and a handover of an AS may occur, and service continuity needs to be ensured in a handover process, in order to meet the end-to-end latency requirement all the time.

Currently, a feasible solution to locally deploy an application server is to use an uplink classifier (ULCL) mechanism. In a ULCL scenario, for one packet data unit (PDU) session, there may be a plurality of UPF entities, and local offloading may be implemented using a ULCL. In this way, an application server that provides an ultra-low latency service or a high-value service can be deployed locally. In such a deployment, a path between the terminal and the AS is shortest, such that end-to-end latency can meet an ultra-low latency requirement.

However, currently, there is no related solution to ensure the service continuity in the handover process.

SUMMARY

Embodiments of this application provide a service continuity implementation method, a device, and a service continuity implementation system, to ensure service continuity in a handover process.

According to a first aspect, a service continuity implementation method is provided. The method includes: selecting, by a session management function entity, a target user plane function entity to serve a terminal; sending, by the session management function entity, a first message to a control device; receiving, by the session management function entity, indication information of a first application server (AS) from the control device; and sending, by the session management function entity, a first routing rule to the target user plane function entity based on the indication information of the first AS, where the first routing rule includes that data whose destination address is an address of the first AS is sent to the first AS. Based on this solution, in one aspect, after the session management function entity selects the target user plane function entity to serve the terminal, the session management function entity may receive the indication information of the first AS, and send the first routing rule to the target user plane function entity based on the indication information of the first AS, such that the target user plane function entity can transmit service data according to the first routing rule. Therefore, service continuity can be ensured in a handover process of a user plane function entity. In another aspect, the first routing rule is that the data whose destination address is the address of the first AS is sent to the first AS. This prevents the target user plane function entity from routing the data that is to be sent to the first AS first to a remote data network and then to the first AS. Therefore, a path from the terminal to the first AS is shortest, and latency is controllable.

Optionally, after selecting, by a session management function entity, a target user plane function entity to serve a terminal, and before sending, by the session management function entity, a first routing rule to the target user plane function entity, the method further includes: sending, by the session management function entity, a second routing rule to the target user plane function entity, where the second routing rule includes that data whose destination address is an address of a second AS is sent to a source user plane function entity, the second AS is an AS currently serving the terminal, and the source user plane function entity is a user plane function entity communicatively connected to the second AS. Based on this solution, when a handover of the user plane function entity occurs, the target user plane function entity after the handover includes a routing rule for service data whose destination address is the address of the current AS. Therefore, continuity of the service can be maintained during the handover of the user plane function entity.

Optionally, after selecting, by a session management function entity, a target user plane function entity to serve a terminal, the method further includes: sending, by the session management function entity, first path information to the target user plane function entity; and sending, by the session management function entity, second path information to the source user plane function entity, where the first path information and the second path information are used to establish a forwarding path between the target user plane function entity and the source user plane function entity. Based on this solution, the forwarding path between the target user plane function entity and the source user plane function entity can be established.

Optionally, after selecting, by a session management function entity, a target user plane function entity to serve a terminal, the method further includes: sending, by the session management function entity, a third routing rule to the target user plane function entity, where the third routing rule includes that data whose destination address is an address of a first data network is sent to a remote user plane function entity, and the remote user plane function entity is a user plane function entity communicatively connected to the first data network. Based on this solution, when a handover of the user plane function entity occurs, the target user plane function entity after the handover includes a routing rule for service data whose destination address is the address of the first data network. Therefore, continuity of the service can be maintained during the handover of the user plane function entity.

Optionally, after selecting, by a session management function entity, a target user plane function entity to serve a terminal, the method further includes: sending, by the session management function entity, third path information to the target user plane function entity; and sending, by the session management function entity, fourth path information to the remote user plane function entity, where the third path information and the fourth path information are used to establish a forwarding path between the target user plane function entity and the remote user plane function entity. Based on this solution, the forwarding path between the target user plane function entity and the remote user plane function entity can be established.

Optionally, after sending, by the session management function entity, a first routing rule to the target user plane function entity, the method further includes: sending, by the session management function entity, a second message to the target user plane function entity, where the second message is used to request to delete the second routing rule. In other words, when a network side path has been ready, a routing rule corresponding to an original service on the target user plane function entity can be released.

Optionally, after sending, by the session management function entity, a first routing rule to the target user plane function entity, the method further includes: sending, by the session management function entity, a third message to the target user plane function entity, where the third message is used to request to delete the first path information. In other words, if the network side path has been ready, path information corresponding to an original service on the target user plane function entity can be released.

Optionally, after sending, by the session management function entity, a first routing rule to the target user plane function entity, the method further includes: sending, by the session management function entity, a fourth message to the source user plane function entity, where the fourth message is used to request to delete user plane information, corresponding to the terminal, on the source user plane function entity, and the user plane information includes the second path information. In other words, if the network side path has been ready, the user plane information, corresponding to the terminal, on the source user plane function entity can be released.

Optionally, before selecting, by a session management function entity, a target user plane function entity to serve a terminal, the method further includes: sending, by the session management function entity, fifth path information to a target base station; and sending, by the session management function entity, sixth path information to the source user plane function entity, where the fifth path information and the sixth path information are used to establish a forwarding path between the target base station and the source user plane function entity, the source user plane function entity is a user plane function entity currently establishing a first packet data unit PDU session with the terminal, and the target base station is a base station currently communicatively connected to the target user plane function entity. Based on this solution, the forwarding path between the target base station and the source user plane function entity can be pre-established, such that when a handover of the user plane function entity occurs, continuity of a current service can be maintained.

Optionally, selecting, by a session management function entity, a target user plane function entity to serve a terminal includes: sending, by the session management function entity, a fifth message to the terminal, where the fifth message is used to request to establish a second PDU session; and selecting, by the session management function entity in a process of establishing the second PDU session, the target user plane function entity to serve the terminal. Based on this solution, the session management function entity can select the target user plane function entity to serve the terminal.

Optionally, after sending, by the session management function entity, a first routing rule to the target user plane function entity, the method further includes: sending, by the session management function entity, a sixth message to the terminal, where the sixth message is used to request to release the first PDU session. In other words, when a network side path for a new PDU session has been ready, an old PDU session resource can be released.

Optionally, after sending, by the session management function entity, a first routing rule to the target user plane function entity, the method further includes: sending, by the session management function entity, a seventh message to the control device, where the seventh message is used to request to switch the terminal from the second AS to the first AS, and the second AS is the AS currently serving the terminal. Based on this solution, the terminal can be switched from the second AS to the first AS.

Optionally, after sending, by the session management function entity, a seventh message to the control device, the method further includes: receiving, by the session management function entity, an eighth message from the control device, where the eighth message is used to indicate that the terminal has been switched from the second AS to the first AS. In this way, the control device can learn of, in a timely manner, whether a handover of the AS is completed, and can further perform a subsequent operation in a timely manner.

Optionally, the first message includes at least one of location information of the target user plane function entity or location information of the terminal, and at least one of the location information of the target user plane function entity or the location information of the terminal is used to determine that an AS serving the terminal is the first AS. In this way, after receiving the first message, the control device can determine, based on the first message, the AS serving the terminal.

Optionally, the indication information of the first AS includes location information of the first AS, identifier information of the first AS, information indicating that the AS does not change, or the like. This is not specifically limited in this embodiment of this application.

According to a second aspect, a service continuity implementation method is provided. The method includes: receiving, by a control device, a first message from a session management function entity; and sending, by the control device, indication information of a first AS to the session management function entity, where the indication information of the first AS is used to instruct the session management function entity to send a first routing rule to a target user plane function entity, and the first routing rule includes that data whose destination address is an address of the first AS is sent to the first AS. Based on this solution, in one aspect, after the control device sends the indication information of the first AS to the session management function entity, the session management function entity may receive the indication information of the first AS, and send the first routing rule to the target user plane function entity based on the indication information of the first AS, such that the target user plane function entity can transmit service data according to the first routing rule. Therefore, service continuity can be ensured in a handover process of a user plane function entity. In another aspect, the first routing rule is that the data whose destination address is the address of the first AS is sent to the first AS. This prevents the target user plane function entity from routing the data that is to be sent to the address of the first AS first to a remote data network and then to the first AS. Therefore, a path from a terminal to the first AS is shortest, and latency is controllable.

Optionally, the first message includes at least one of location information of the target user plane function entity or location information of the terminal, and at least one of the location information of the target user plane function entity or the location information of the terminal is used to determine that an AS serving the terminal is the first AS. In this way, after receiving the first message, the control device can determine, based on the first message, the AS serving the terminal.

Optionally, after sending, by the control device, indication information of a first AS to the session management function entity, the method further includes: receiving, by the control device, a seventh message from the session management function entity, where the seventh message is used to instruct to switch the terminal from a second AS to the first AS, and the second AS is an AS currently serving the terminal; and switching, by the control device, the terminal from the second AS to the first AS based on the seventh message. Based on this solution, the terminal can be switched from the second AS to the first AS.

Optionally, the control device includes a vehicle to everything (V2X) communication control function entity.

According to a third aspect, a session management function entity is provided. The session management function entity has a function of implementing the method according to the first aspect. The function may be implemented using hardware, or may be implemented using hardware by executing corresponding software. The hardware or the software includes one or more modules corresponding to the function.

According to a fourth aspect, a session management function entity is provided, including a processor, a memory, a bus, and a communications interface. The memory is configured to store a computer executable instruction. The processor is connected to the memory using the bus. When the session management function entity runs, the processor executes the computer executable instruction stored in the memory, such that the session management function entity performs the service continuity implementation method according to any one of the design manners of the first aspect.

According to a fifth aspect, an embodiment of this application provides a computer-readable storage medium. The computer-readable storage medium stores an instruction. When the instruction is run on a computer, the computer is enabled to perform the service continuity implementation method according to any one of the design manners of the first aspect.

According to a sixth aspect, an embodiment of this application provides a computer program product including an instruction. When the computer program product is run on a computer, the computer is enabled to perform the service continuity implementation method according to any one of the design manners of the first aspect.

For technical effects brought by any one of the design manners of the third aspect to the sixth aspect, refer to technical effects brought by different design manners of the first aspect. Details are not described herein again.

According to a seventh aspect, a control device is provided. The control device has a function of implementing the method according to the second aspect. The function may be implemented using hardware, or may be implemented using hardware by executing corresponding software. The hardware or the software includes one or more modules corresponding to the function.

According to an eighth aspect, a control device is provided, including a processor, a memory, a bus, and a communications interface. The memory is configured to store a computer executable instruction. The processor is connected to the memory using the bus. When the control device runs, the processor executes the computer executable instruction stored in the memory, such that the control device performs the service continuity implementation method according to any one of the design manners of the second aspect.

According to a ninth aspect, a computer-readable storage medium is provided. The computer-readable storage medium stores an instruction. When the instruction is run on a computer, the computer is enabled to perform the service continuity implementation method according to any one of the design manners of the second aspect.

According to a tenth aspect, a computer program product including an instruction is provided. When the computer program product is run on a computer, the computer is enabled to perform the service continuity implementation method according to any one of the design manners of the second aspect.

For technical effects brought by any one of the design manners of the seventh aspect to the tenth aspect, refer to technical effects brought by different design manners of the second aspect. Details are not described herein again.

According to an eleventh aspect, a service continuity implementation method is provided. The method includes: selecting, by a session management function entity, a target user plane function entity to serve a terminal; sending, by the session management function entity, a first message to a control device, receiving, by the control device, the first message from the session management function entity; sending, by the control device, indication information of a first AS to the session management function entity; and receiving, by the session management function entity, the indication information of the first AS from the control device; and sending, by the session management function entity, a first routing rule to the target user plane function entity based on the indication information of the first AS, where the first routing rule includes that data whose destination address is an address of the first AS is sent to the first AS.

According to a twelfth aspect, a service continuity implementation system is provided, including the control device according to any one of the foregoing aspects and the session management function entity according to any one of the foregoing aspects.

These aspects or other aspects in this application may be clearer and easier to understand in descriptions in the following embodiments.

DESCRIPTION OF EMBODIMENTS

Figure 1:
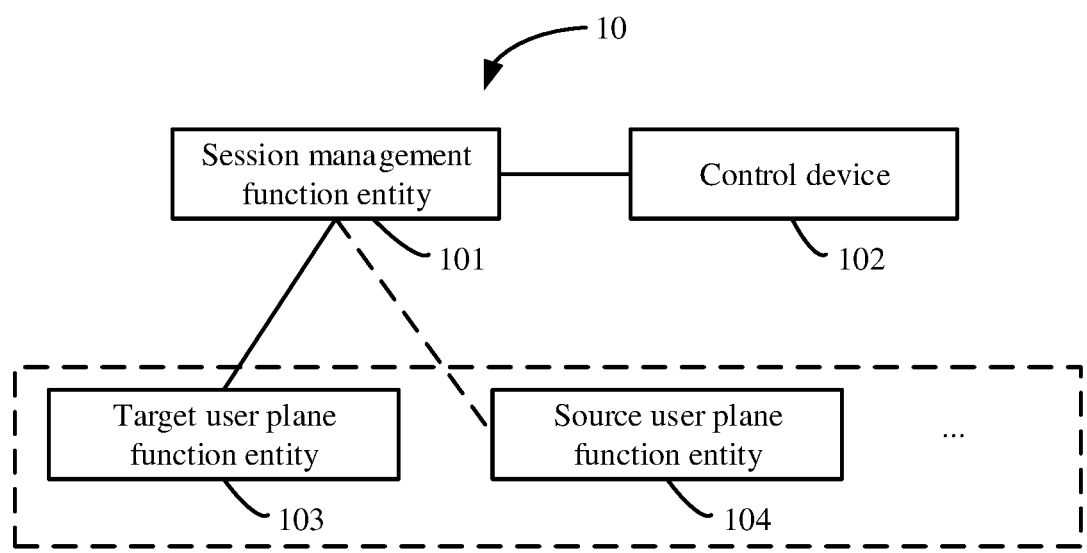
FIG. 1 is a first schematic architectural diagram of a service continuity implementation system according to an embodiment of this application.

For ease of understanding technical solutions in the embodiments of this application, the following first briefly describes technologies related to this application.

1. Tunnel

Tunnels in the embodiments of this application include a next generation (Next generation, N) interface 3 (N3) tunnel and an N interface 9 (N9) tunnel. The N3 tunnel is a tunnel between an access device (for example, a base station) and a UPF entity. The N9 tunnel is a tunnel between UPF entities. Generally, the N3 tunnel is a tunnel at a session granularity, and the N9 tunnel may be a tunnel at a session granularity, or a tunnel at a device granularity.

The tunnel at a session granularity means the resources of the tunnel are established for one PDU session, and the tunnel is used for only one PDU session. One tunnel at a session granularity includes only one routing rule, and only the routing rule can correspond to the tunnel for forwarding data. In addition, a lifecycle of the tunnel at a session granularity is a lifecycle of one PDU session. To be more specific, when the PDU session disappears or is released, the tunnel at a session granularity also needs to be released.

The tunnel at a device granularity is a tunnel resource established for one or more PDU sessions, and the tunnel may be used for one or more PDU sessions. One tunnel at a device granularity may include one or more routing rules, and each of the one or more routing rules can correspond to the tunnel for forwarding data. In addition, a lifecycle of the tunnel at a device granularity is a lifecycle of a plurality of PDU sessions corresponding to the tunnel. To be more specific, assuming that the tunnel at a device granularity corresponds to M PDU sessions, when the first M-1 PDU sessions in the plurality of PDU sessions corresponding to the tunnel disappear or are released, only routing rules corresponding to the corresponding PDU sessions are released; and the tunnel at a device granularity can be released only when an $M^{th}$ PDU session in the plurality of PDU sessions corresponding to the tunnel disappears or is released. Certainly, when the $M^{th}$ PDU session in the plurality of PDU sessions corresponding to the tunnel disappears or is released, the tunnel at a device granularity may be alternatively retained, such that the tunnel does not need to be re-established subsequently. This is not specifically limited in the embodiments of this application.

2. Routing Rule

A routing rule in the embodiments of this application is a rule for routing service data to a next-hop device.

For example, a first routing rule on a target UPF entity in the following embodiments includes that data whose destination address is an address of a first AS is sent to the first AS. This means that a next-hop device for service data whose destination address is the address of the first AS is the first AS.

Alternatively, for example, a second routing rule on a target UPF entity in the following embodiments includes that data whose destination address is an address of an AS 1 is sent to a source UPF entity. This means that a next-hop device for service data whose destination address is the address of the AS 1 is the source UPF entity.

Alternatively, for example, a third routing rule on a target UPF entity includes that data whose destination address is an address of an anchor data network (A-DN) or data whose destination address is default is sent to an A-UPF entity. This means that a next-hop device for service data whose destination address is the address of the A-DN or service data whose destination address is default is the A-UPF entity.

Alternatively, for example, a fourth routing rule on a source UPF entity includes that data whose destination address is an address of a terminal is sent to a target UPF entity. This means that a next-hop device for service data whose destination address is the address of the terminal is the target UPF entity.

Alternatively, for example, a fifth routing rule on a source UPF entity includes that data whose destination address is an address of a terminal is sent to a target base station. This means that a next-hop device for service data whose destination address is the address of the terminal is the target base station.

3. Path Information

Path information in the embodiments of this application includes at least one of tunnel uplink information of A or tunnel downlink information of B, and is used to establish a tunnel between A and B. The tunnel uplink information of A may include an endpoint address of the tunnel on the A side, an address of A, and the like. The tunnel downlink information of B includes an endpoint address of the tunnel on the B side, an address of B, and the like. This is not specifically limited in the embodiments of this application.

It should be noted that the path information in the embodiments of this application may include a routing rule, or may not include a routing rule. The following embodiments are described using an example in which path information does not include a routing rule. A general description is provided herein, and details are not described below again.

The following describes the technical solutions in the embodiments of this application with reference to the accompanying drawings in the embodiments of this application. In descriptions of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of this application, "a plurality of" means two or more than two unless otherwise specified. In addition, to clearly describe the technical solutions in the embodiments of this application, terms such as "first" and "second" are used in the embodiments of this application to distinguish between same items or similar items that have basically the same functions or purposes. A person skilled in the art may understand that the terms such as "first" and "second" do not limit a quantity or an execution sequence, and that the terms such as "first" and "second" do not indicate a definite difference. For example, a first AS and a second AS in the embodiments of this application may be a same AS, or may be different ASs. This is not specifically limited in the embodiments of this application.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that, with evolution of the network architecture and emergence of a new service scenario, the technical solutions provided in the embodiments of this application are also applicable to similar technical problems.

FIG. 1 is a schematic architectural diagram of a service continuity implementation system 10 according to an embodiment of this application. The service continuity implementation system 10 includes a session management function entity 101 and a control device 102, and may further include a plurality of user plane function entities. For example, the plurality of user plane function entities may include a target user plane function entity 103 and a source user plane function entity 104.

In an initial state, the session management function entity 101 communicates with the source user plane function entity 104.

After a terminal moves, the session management function entity 101 is configured to: select the target user plane function entity 103 to serve the terminal; and send a first message to the control device 102.

The control device 102 is configured to: receive the first message from the session management function entity 101; and send indication information of a first AS to the session management function entity 101.

The session management function entity 101 is further configured to: receive the indication information of the first AS from the control device 102; and send a first routing rule to the target user plane function entity 103 based on the indication information of the first AS, where the first routing rule includes that data whose destination address is an address of the first AS is sent to the first AS.

The target user plane function entity 103 is configured to: receive the first routing rule from the session management function entity 101; and transmit service data according to the first routing rule after a PDU session is established.

Optionally, the session management function entity 101 and the control device 102 in FIG. 1 may directly communicate with each other, or may communicate with each other through forwarding by another network device. This is not specifically limited in this embodiment of this application.

Optionally, the session management function entity 101 and the target user plane function entity 103 in FIG. 1 may directly communicate with each other, or may communicate with each other through forwarding by another network device. This is not specifically limited in this embodiment of this application.

According to the service continuity system provided in this embodiment of this application, in one aspect, after the session management function entity selects the target user plane function entity to serve the terminal, the session management function entity may receive the indication information of the first AS, and send the first routing rule to the target user plane function entity based on the indication information of the first AS, such that the target user plane function entity can transmit the service data according to the first routing rule. Therefore, service continuity can be ensured in a handover process of the user plane function entity. In another aspect, the first routing rule is that the data whose destination address is the address of the first AS is sent to the first AS. This prevents the target user plane function entity from routing the data that is to be sent to the address of the first AS first to a remote data network (DN) and then to the first AS. Therefore, a path from the terminal to the first AS is shortest, and latency is controllable.

Optionally, the service continuity implementation system 10 may be applied to a future 5G network and another future network. This is not specifically limited in this embodiment of this application. The following provides two typical scenarios in which the service continuity implementation system 10 is applied to a current 5G network.

Scenario 1

Figure 2:
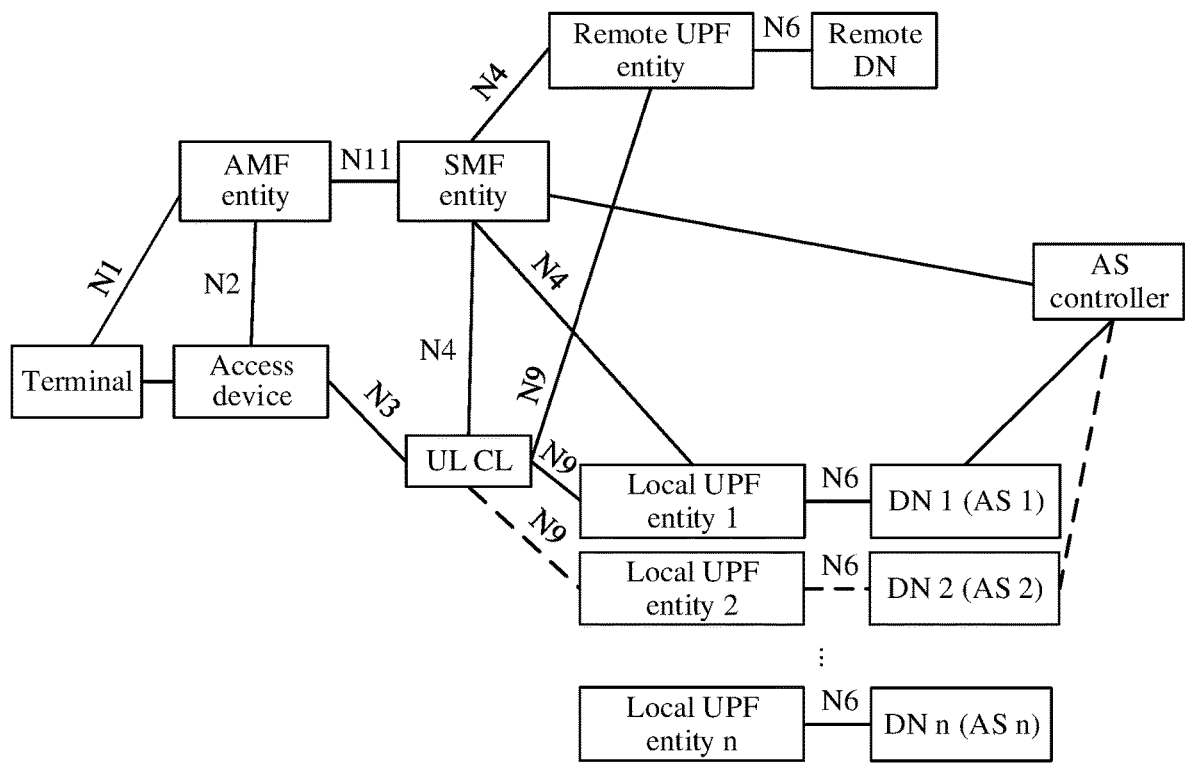
FIG. 2 is a second schematic architectural diagram of a service continuity implementation system according to an embodiment of this application.

If the service continuity implementation system 10 is applied to the current 5G network, a possible applicable architecture is a ULCL architecture shown in FIG. 2. In a ULCL scenario, there may be a plurality of UPF entities for one PDU session, and local offloading may be implemented using a ULCL. The plurality of UPF entities include at least one local UPF entity and a remote UPF entity. The at least one local UPF entity may include, for example, a local UPF entity 1, a local UPF entity 2, . . . , and a local UPF entity n. The session management function entity 101 in FIG. 1 may be a session management function (SMF) entity in the ULCL architecture, the control device 102 in FIG. 1 may be an AS controller (controller) in the ULCL architecture, the target user plane function entity in FIG. 1 may be any UPF entity in the ULCL architecture, for example, the local UPF entity 1, and the source user plane function entity in FIG. 1 may be any UPF entity different from the local UPF entity 1 in the ULCL architecture, for example, the local UPF entity 2. In addition, as shown in FIG. 2, the ULCL architecture may further include a terminal, an access device, an access and mobility management function (AMF) entity, the ULCL, and a plurality of data networks (DNs). The plurality of DNs include one remote DN and a plurality of local DNs. The plurality of local DNs may include, for example, a DN 1, a DN 2, . . . , and a DN n.

The terminal communicates with the AMF entity using a next generation (next generation, N) network interface 1 (N1), and communicates with the ULCL using the access device. The access device communicates with the AMF entity using an N interface 2 (N2), and communicates with the ULCL using an N interface 3 (N3). The AMF entity communicates with the SMF entity using an N interface 11 (N11). The SMF entity communicates with the UPF entities (including the remote UPF entity and the local UPF entity)

and the ULCL using an N interface 4 (N4). The ULCL communicates with the UPF entities (including the remote UPF entity and the local UPF entity) using an N interface 9 (N9). The UPF entities (including the remote UPF entity and the local UPF entity) communicate with the DNs (including the remote DN and the local DN) using an N interface 6 (N6).

Optionally, in this embodiment of this application, the local UPF entity and the ULCL may be deployed together or separately. This is not specifically limited in this embodiment of this application. When the local UPF entity and the ULCL are deployed separately, the ULCL may be implemented using the UPF entity. A general description is provided herein, and details are not described below again.

Optionally, in this embodiment of this application, the local UPF entity is a local service anchor. A local AS is deployed in a DN communicatively connected to the local UPF entity, and the terminal may access the local AS using the local UPF entity.

It should be noted that a communication connection in this embodiment of this application may be a direct connection, or may be a connection using another network device. A general description is provided herein, and details are not described below again.

Optionally, in this embodiment of this application, the remote UPF entity is an Internet Protocol (IP) anchor. An IP address remains unchanged if the UPF entity remains unchanged. A remote AS may be deployed in a DN communicatively connected to the remote UPF entity, and the terminal may access the remote AS using the remote UPF entity. Certainly, the terminal may communicate with another terminal using the DN communicatively connected to the remote UPF entity. This is not specifically limited in this embodiment of this application.

In FIG. 2, for uplink data, the ULCL forwards, according to an offloading rule delivered by the SMF entity, a local service to the local UPF entity and a non-local service to the remote UPF entity.

In this scenario, for a terminal using a URLLC service, in a moving process of the terminal, the remote UPF entity remains unchanged, and therefore the IP address remains unchanged. However, to ensure that a path between the terminal and an AS is shortest, a handover of the local UPF entity and a handover of an AS may need to be performed. The AS controller maintains topology information of an AS, and may perform AS selection or reselection based on location information of the local UPF entity and/or location information of the terminal. Therefore, when the handover of the local UPF entity needs to be performed, the SMF entity needs to interact with the AS controller to implement the AS reselection, in order to implement the shortest path between the terminal and the AS.

It should be noted that FIG. 2 shows an example in which different local UPF entities communicate with AS s in different DNs. Certainly, in another example, the different local UPF entities may communicate with an AS in a same DN. In other words, after the handover of the local UPF entity occurs, the handover of the AS may not occur. This is not specifically limited in this embodiment of this application.

Scenario 2

Figure 3:
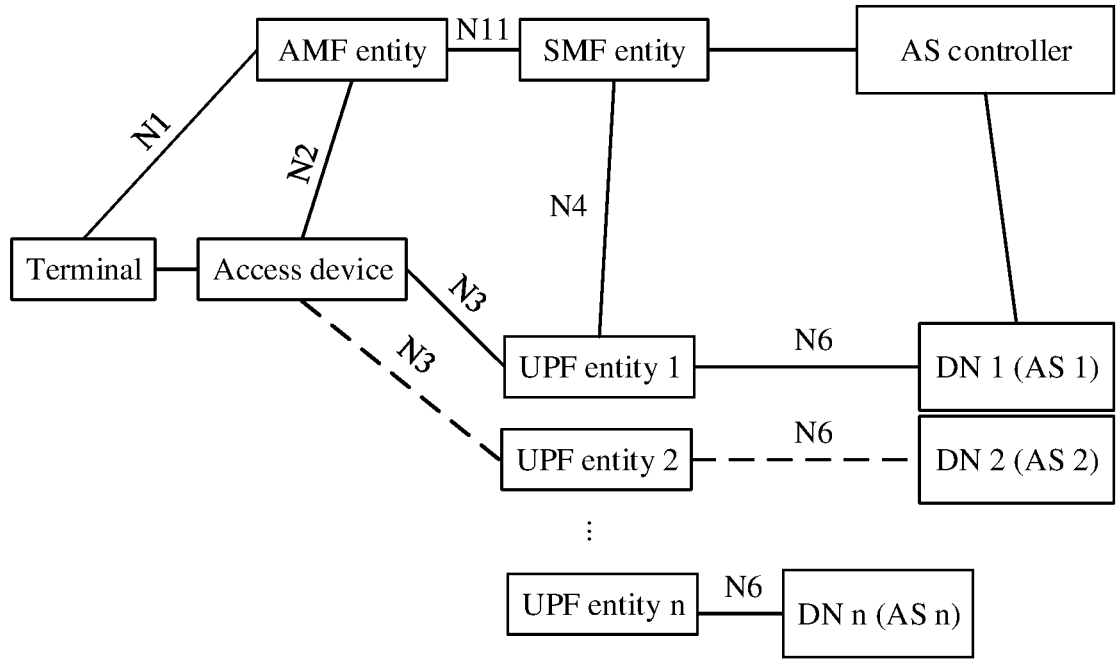
FIG. 3 is a third schematic architectural diagram of a service continuity implementation system according to an embodiment of this application.

Optionally, if the service continuity implementation system 10 is applied to the current 5G network, another possible applicable architecture is shown in FIG. 3. The network architecture shown in FIG. 3 corresponds to a single-anchor PDU session scenario. To be more specific, one PDU session corresponds to one UPF entity. For example, the session management function entity 101 in FIG. 1 may be an SMF entity in FIG. 3, the control device 102 in FIG. 1 may be an AS controller in FIG. 3, the target user plane function entity in FIG. 1 may be a UPF entity 1 in FIG. 3, and the source user plane function entity in FIG. 1 may be a UPF entity 2 in FIG. 3. In addition, as shown in FIG. 3, the network architecture may further include a terminal, an access device, an AMF entity, and a DN. An AS is deployed in the DN. To ensure that a path between the terminal and the AS is shortest, the UPF entity and the AS usually need to be deployed locally. Certainly, for a service with a low end-to-end latency requirement, the UPF entity and the AS may not be deployed locally. This is not specifically limited in this embodiment of this application.

The terminal communicates with the AMF entity using an N1, and communicates with UPF entities (including the UPF entity 1 to a UPF entity n) using the access device. The access device communicates with the AMF entity using an N2, and communicates with the UPF entities (including the UPF entity 1 to the UPF entity n) using an N3. The AMF entity communicates with the SMF entity using an N11. The SMF entity communicates with the UPF entities (including the UPF entity 1 to the UPF entity n) using an N4. The UPF entity (including the UPF entity 1 to the UPF entity n) communicates with DNs (including a DN 1 to a DN n) using an N6.

In this scenario, for a terminal using a URLLC service, in a moving process of the terminal, a handover of the UPF entity and a handover of the AS may need to be performed. The AS controller maintains topology information of an AS, and may perform AS selection or reselection based on location information of the local UPF entity and/or location information of the terminal. Therefore, when the handover of the UPF entity needs to be performed, the SMF entity needs to interact with the AS controller to implement the AS reselection, in order to implement the shortest path between the terminal and the AS.

It should be noted that FIG. 3 shows an example in which different UPF entities communicate with AS s in different DNs. Certainly, alternatively, the different UPF entities may communicate with an AS in a same DN. In other words, after the handover of the UPF entity occurs, the handover of the AS may not occur. This is not specifically limited in this embodiment of this application.

It should be noted that names of interfaces between network elements in FIG. 2 and FIG. 3 are merely examples, and the interfaces may have other names during specific implementation. This is not specifically limited in this embodiment of this application.

It should be noted that the access device, the AMF entity, the SMF entity, the UPF entity, the AS, the AS controller, and the like in FIG. 2 and FIG. 3 are merely names, and the names constitute no limitation on the devices. In the 5G network and other future networks, the access device, the AMF entity, the SMF entity, the UPF entity, the AS, and the AS controller may have other names. This is not specifically limited in this embodiment of this application. For example, the UPF entity may be alternatively replaced with a UP, the AS may be alternatively replaced with an application management platform or a mobile edge computing (MEC) platform, and the AS controller may be alternatively replaced with a vehicle to everything (V2X) communication control function entity or the like. A general description is provided herein, and details are not described below again.

Optionally, the terminal in this embodiment of this application may include various handheld devices, vehicle-mounted devices, wearable devices, and computing devices that have a wireless communications function, or other processing devices connected to a wireless modem. The terminal may further include a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, a user equipment (UE), a mobile station (MS), a terminal device, and the like. For ease of description, the devices mentioned above are collectively referred to as a terminal in this application.

Optionally, the access device in this embodiment of this application is a device that accesses a core network. For example, the access device may be a base station, a broadband network gateway (BNG), an aggregation switch, or a non-3GPP access device. The base station may include a macro base station, a micro base station (also referred to as a small cell), a relay station, an access point, and the like in various forms.

Optionally, the AMF entity in this embodiment of this application is responsible for functions such as registration management, mobility management, and lawful interception.

Optionally, for functions of the SMF entity and the AS controller in this embodiment of this application, refer to the descriptions in FIG. 1. Details are not described herein again. In addition, the SMF entity is further configured to perform session management, including session establishment, session modification, session release, and other session-related control functions such as allocation and management of an IP address of the terminal, selection and control of the UPF entity, and lawful interception.

Optionally, the UPF entity in this embodiment of this application may be responsible for processing functions such as forwarding and statistics collection of a packet of the terminal. For example, the UPF entity may perform user plane functions of a serving gateway (SGW) and a packet data network gateway (PGW). Alternatively, the UPF entity may be a software-defined networking (SDN) switch. This is not specifically limited in this embodiment of this application.

Optionally, the session management function entity 101 and the control device 102 in FIG. 1 may be implemented by one physical device, or may be jointly implemented by a plurality of physical devices, or may be a logical function module in a physical device. This is not specifically limited in this embodiment of this application.

Figure 4:
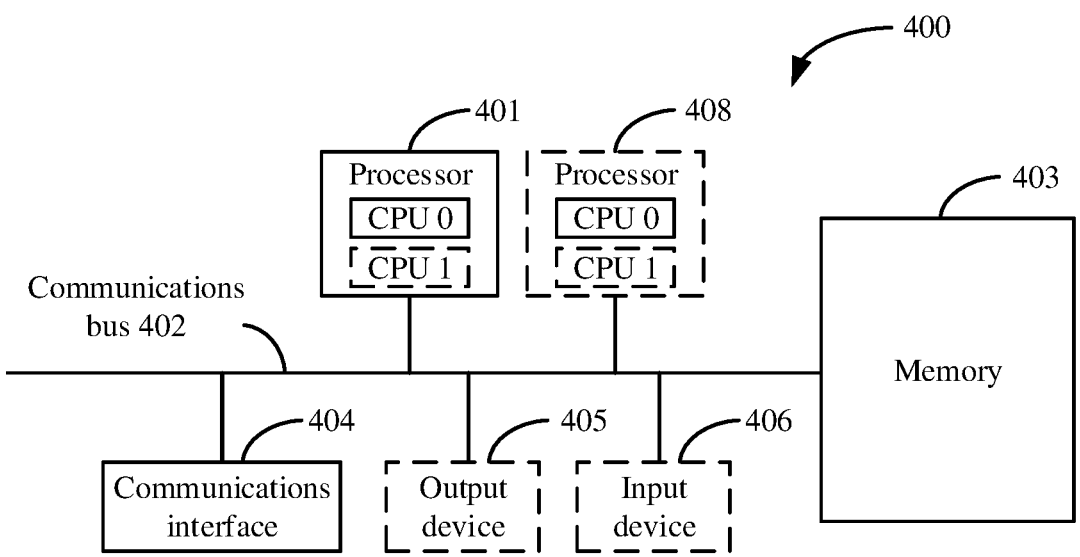
FIG. 4 is a schematic diagram of a hardware structure of a communications device according to an embodiment of this application.

For example, as shown in FIG. 4, both the session management function entity 101 and the control device 102 in FIG. 1 may be implemented by a communications device in FIG. 4.

FIG. 4 is a schematic diagram of a hardware structure of a communications device according to an embodiment of this application. The communications device 400 includes at least one processor 401, a communications bus 402, a memory 403, and at least one communications interface 404.

The processor 401 may be a general-purpose central processing unit (CPU), a microprocessor, an application-specific integrated circuit (ASIC), or one or more integrated circuits configured to control execution of a program in the solutions of this application.

The communications bus 402 may include a path used to transmit information between the foregoing components.

The communications interface 404 is any apparatus such as a transceiver, and is configured to communicate with another device or communications network, such as the Ethernet, a radio access network (RAN), or a wireless local area network (WLAN).

The memory 403 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc (CD) read-only memory (CD-ROM) or another compact disc storage, an optical disc storage (including a compressed optical disc, a laser disc, an optical disc, a digital versatile disc, a Blu-ray optical disc, and the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor using the bus. The memory may be alternatively integrated with the processor.

The memory 403 is configured to store application program code for performing the solutions in this application, and the application program code is executed under control of the processor 401. The processor 401 is configured to execute the application program code stored in the memory 403 to implement a service continuity implementation method provided in the following embodiments of this application.

During implementation, in an embodiment, the processor 401 may include one or more CPUs, for example, a CPU 0 and a CPU 1 in FIG. 4.

During implementation, in an embodiment, the communications device 400 may include a plurality of processors, for example, the processor 401 and a processor 408 in FIG. 4. Each of these processors may be a single-core (single-CPU) processor, or may be a multi-core (multi-CPU) processor. The processor herein may be one or more devices, circuits, and/or processing cores configured to process data (for example, a computer program instruction).

During implementation, in an embodiment, the communications device 400 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, or a projector. The input device 406 communicates with the processor 401, and may receive user input in a plurality of manners. For example, the input device 406 may be a mouse, a keyboard, a touchscreen device, or a sensing device.

The communications device 400 may be a general-purpose communications device or a dedicated communications device. During implementation, the communications device 400 may be a desktop computer, a portable computer, a network server, a palmtop computer (PDA), a mobile phone, a tablet computer, a wireless terminal device, an embedded device, or a device with a structure similar to that in FIG. 4. A type of the communications device 400 is not limited in this embodiment of this application.

The following describes in detail a service continuity implementation method provided in the embodiments of this application with reference to FIG. 1 to FIG. 4.

Figure 5:
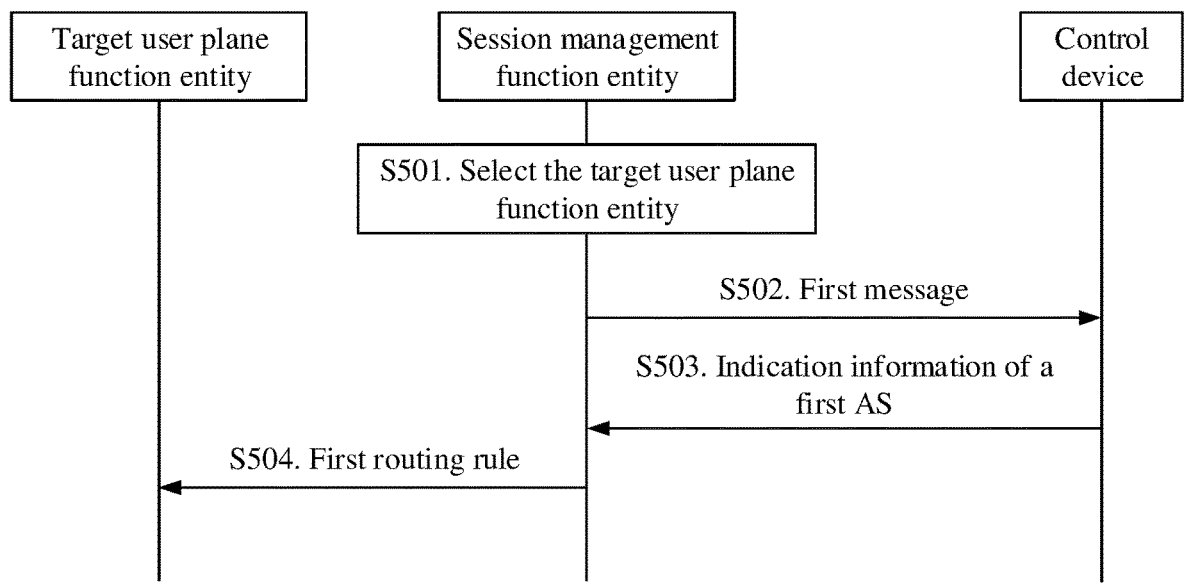
FIG. 5 is a first schematic flowchart of a service continuity implementation method according to an embodiment of this application.

First, with reference to the service continuity implementation system 10 shown in FIG. 1, FIG. 5 is a schematic flowchart of a service continuity implementation method according to an embodiment of this application. Interactions between a session management function entity 101, a control device 102, and a target user plane function entity 103 are involved, and the following steps are included.

S501. The session management function entity selects the target user plane function entity to serve a terminal.

S502. The session management function entity sends a first message to the control device, such that the control device receives the first message from the session management function entity.

S503. The control device sends indication information of a first AS to the session management function entity, such that the session management function entity receives the indication information of the first AS from the control device.

Optionally, in this embodiment of this application, the indication information of the first AS may be location information of the first AS, identifier information of the first AS, information indicating that the AS does not change, or the like. This is not specifically limited in this embodiment of this application.

S504. The session management function entity sends a first routing rule to the target user plane function entity based on the indication information of the first AS, such that the target user plane function entity receives the first routing rule from the session management function entity, where the first routing rule includes that data whose destination address is an address of the first AS is sent to the first AS.

For a related description of the routing rule, refer to the descriptions in the preface part of the embodiments. Details are not described herein again.

According to the service continuity implementation method provided in this embodiment of this application, in one aspect, after the session management function entity selects the target user plane function entity to serve the terminal, the session management function entity may receive the indication information of the first AS, and send the first routing rule to the target user plane function entity based on the indication information of the first AS, such that the target user plane function entity can transmit service data according to the first routing rule. Therefore, service continuity can be ensured in a handover process of a user plane function entity. In another aspect, the first routing rule is that the data whose destination address is the address of the first AS is sent to the first AS. This prevents the target user plane function entity from routing the data that is to be sent to the address of the first AS first to a remote DN and then to the first AS. Therefore, a path from the terminal to the first AS is shortest, and latency is controllable.

The actions of the session management function entity in steps S501, S502, and S504 may be performed by the processor 401 in the communications device 400 shown in FIG. 4 by invoking the application program code stored in the memory 403. This is not limited in this embodiment of this application.

The action of the control device in step S03 may be performed by the processor 401 in the communications device 400 shown in FIG. 4 by invoking the application program code stored in the memory 403. This is not limited in this embodiment of this application.

Then, the service continuity implementation method shown in FIG. 5 is described in detail using an example in which the service continuity implementation system 10 shown in FIG. 1 is applied to the scenario 1 shown in FIG. 2.

Figure 6A:
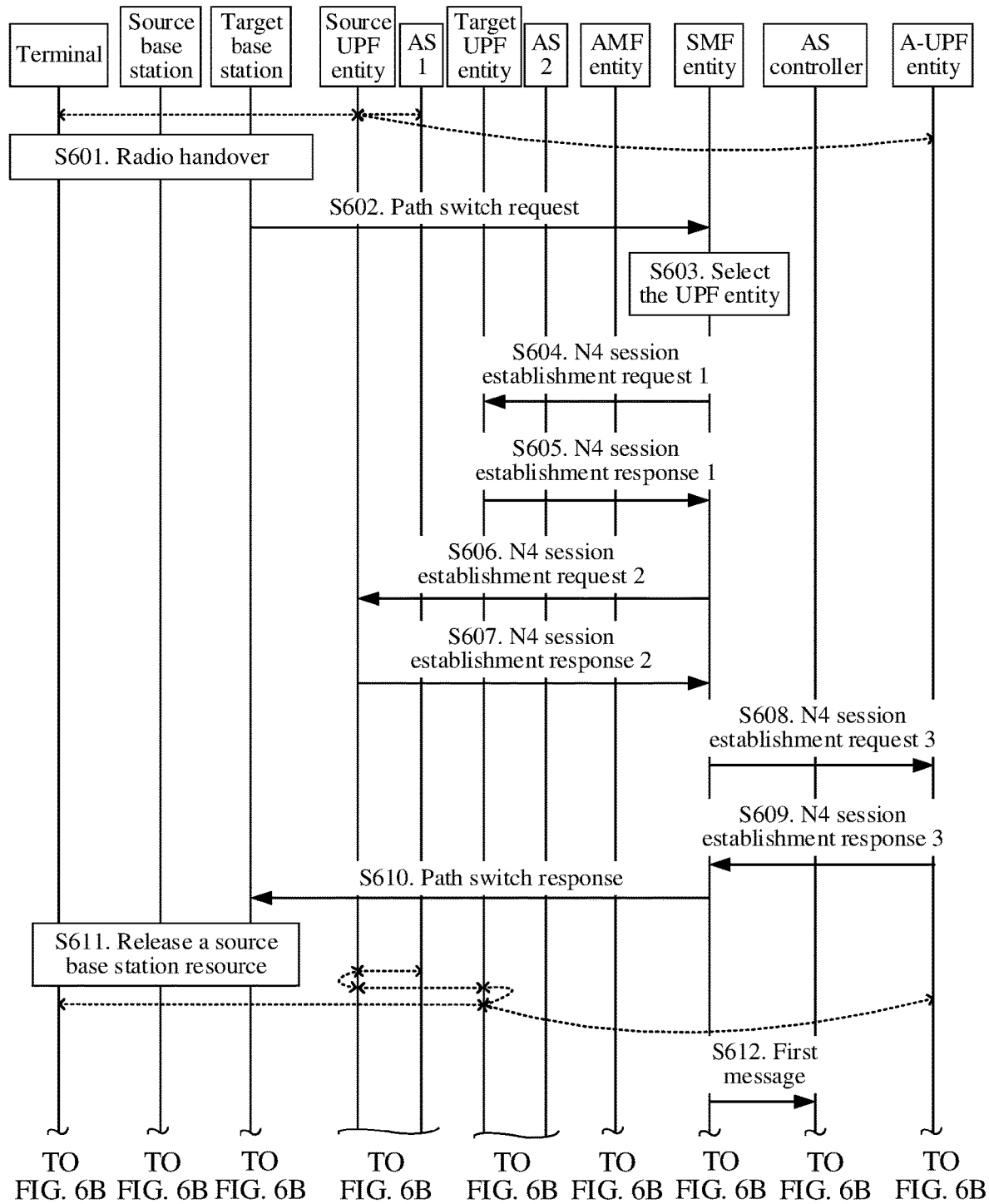
FIG. 6A and FIG. 6B are second schematic flowcharts of a service continuity implementation method according to an embodiment of this application.
Figure 6B:
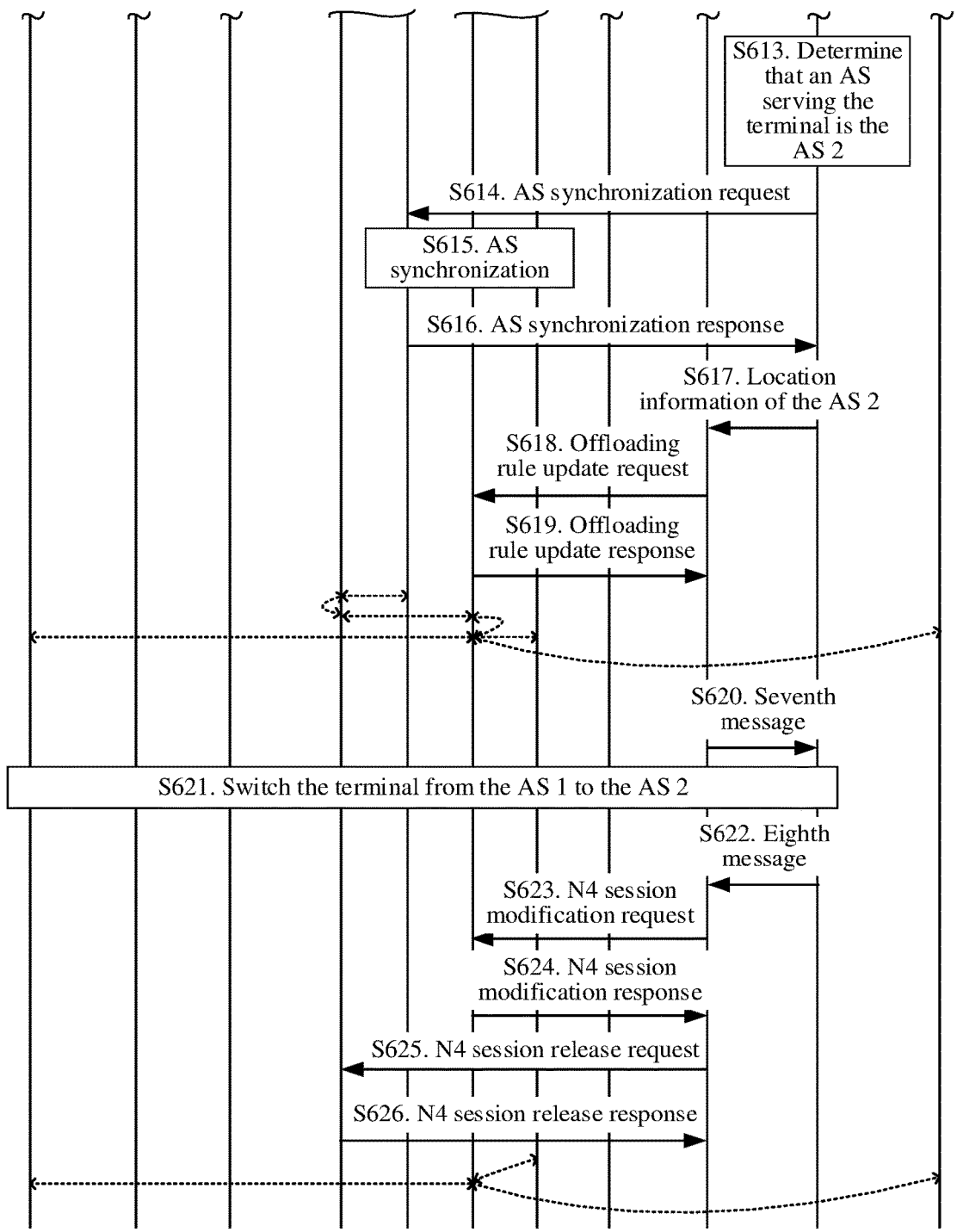

It is assumed that in an initial state, a terminal communicates with an AS 1 using an access device (assumed to be a source base station herein) and a local UPF entity 2 (referred to as a source UPF entity herein). In addition, the terminal communicates with a remote DN (referred to as an A-DN herein) using the source UPF entity and a remote UPF entity (referred to as an A-UPF entity herein). FIG. 6A and FIG. 6B are schematic flowcharts of a service continuity implementation method according to an embodiment of this application. Interactions between the terminal, the source base station, a target base station, the source UPF entity, a local UPF entity 1 (referred to as a target UPF entity herein), the A-UPF entity, an AMF entity, an SMF entity, an AS controller, the AS 1, and an AS 2 are involved, and the following steps are included.

S601. When the terminal moves, the source base station initiates a radio handover.

For an implementation of initiating an air interface handover by the source base station, refer to an existing solution. Details are not described herein.

S602. After completing the air interface handover, the target base station sends a path switch request to the SMF entity, such that the SMF entity receives the path switch request from the target base station.

The path switch request includes N3 tunnel uplink information of the target base station, location information of the terminal, and the like. An N3 tunnel of the target base station is a tunnel between the target base station and the target UPF entity. The N3 tunnel uplink information of the target base station may include an endpoint address of the N3 tunnel of the target base station on the target base station side, an address of the target base station, and the like. This is not specifically limited in this embodiment of this application.

S603. The SMF entity selects, based on the location information of the terminal, the target UPF entity to serve the terminal.

Optionally, if a location of the terminal goes beyond a service range of the source UPF entity, the SMF entity may determine that local UPF entity reselection needs to be performed.

Optionally, the SMF entity may select, based on at least one of the location information of the terminal, a service capability of a local UPF entity managed by the SMF entity, or a load status of the local UPF entity managed by the SMF entity, the target UPF entity to serve the terminal. This is not specifically limited in this embodiment of this application.

S604. The SMF entity sends an N4 session establishment request 1 to the target UPF entity, such that the target UPF entity receives the N4 session establishment request 1 from the SMF entity.

Optionally, the N4 session establishment request 1 may include a second routing rule. The second routing rule includes that data whose destination address is an address of the AS 1 is sent to the source UPF entity.

Optionally, the N4 session establishment request 1 may include first path information. The first path information is used to establish a forwarding path between the source UPF entity and the target UPF entity.

The first path information in this embodiment of this application may include first N9 tunnel downlink information of the source UPF entity. Optionally, the first path information in this embodiment of this application may further include first N9 tunnel uplink information of the target UPF entity. A first N9 tunnel of the source UPF entity and a first N9 tunnel of the target UPF entity are tunnels between the source UPF entity and the target UPF entity. The first N9 tunnel downlink information of the source UPF entity may include an endpoint address of the first N9 tunnel of the source UPF entity on the source UPF entity side, an address of the source UPF entity, and the like. This is not specifically limited in this embodiment of this application. The first N9 tunnel uplink information of the target UPF entity may include an endpoint address of the first N9 tunnel of the target UPF entity on the target UPF entity side, an address of the target UPF entity, and the like. This is not specifically limited in this embodiment of this application. The first N9 tunnel downlink information of the source UPF entity may be allocated by the SMF entity, or may be allocated by the source UPF entity. This is not specifically limited in this embodiment of this application. The first N9 tunnel uplink information of the target UPF entity may be allocated by the SMF entity, or may be allocated by the target UPF entity. This is not specifically limited in this embodiment of this application.

Optionally, the N4 session establishment request 1 may include a third routing rule. The third routing rule includes that data whose destination address is an address of the A-DN or data whose destination address is default is sent to the A-UPF entity.

Optionally, the N4 session establishment request 1 may include third path information. The third path information is used to establish a forwarding path between the target UPF entity and the A-UPF entity.

The third path information in this embodiment of this application may include second N9 tunnel downlink information of the A-UPF entity. Optionally, the third path information in this embodiment of this application may further include second N9 tunnel uplink information of the target UPF entity. A second N9 tunnel of the A-UPF entity and a second N9 tunnel of the target UPF entity are tunnels between the A-UPF entity and the target UPF entity. The second N9 tunnel downlink information of the A-UPF entity may include an endpoint address of the second N9 tunnel of the A-UPF entity on the A-UPF entity side, an address of the A-UPF entity, and the like. This is not specifically limited in this embodiment of this application. The second N9 tunnel uplink information of the target UPF entity may include an endpoint address of the second N9 tunnel of the target UPF entity on the target UPF entity side, the address of the target UPF entity, and the like. This is not specifically limited in this embodiment of this application. The second N9 tunnel downlink information of the A-UPF entity may be allocated by the SMF entity, or may be allocated by the A-UPF entity. This is not specifically limited in this embodiment of this application. The second N9 tunnel uplink information of the target UPF entity may be allocated by the SMF entity, or may be allocated by the target UPF entity. This is not specifically limited in this embodiment of this application.

Optionally, the N4 session establishment request 1 may include seventh path information. The seventh path information is used to establish a forwarding path between the target UPF entity and the target base station.

The seventh path information in this embodiment of this application may include the N3 tunnel uplink information of the target base station in the path switch request. Optionally, if N3 tunnel downlink information of the target UPF entity is allocated by the SMF entity, the seventh path information may further include the N3 tunnel downlink information of the target UPF entity. This is not specifically limited in this embodiment of this application. An N3 tunnel of the target UPF entity is a tunnel between the target base station and the target UPF entity. The N3 tunnel downlink information of the target UPF entity may include an endpoint address of the N3 tunnel of the target UPF entity on the target UPF entity side, the address of the target UPF entity, and the like. This is not specifically limited in this embodiment of this application. Certainly, the N3 tunnel downlink information of the target UPF entity may be alternatively allocated by the target UPF entity. This is not specifically limited in this embodiment of this application.

In addition, the N4 session establishment request 1 may further include other user plane information of a current PDU session, for example, a data packet statistics collection and reporting rule and a quality of service (QoS) rule. This is not specifically limited in this embodiment of this application.

Optionally, the information included in the N4 session establishment request 1 may be sent to the target UPF entity using different messages. This is not specifically limited in this embodiment of this application.

S605. The target UPF entity sends a session establishment response 1 to the SMF entity, such that the SMF entity receives the session establishment response 1 from the target UPF entity.

S606. The SMF entity sends an N4 session establishment request 2 to the source UPF entity, such that the source UPF entity receives the N4 session establishment request 2 from the SMF entity.

Optionally, the N4 session establishment request 2 may include a fourth routing rule. The fourth routing rule includes that data whose destination address is an address of the terminal is sent to the target UPF entity.

Optionally, the N4 session establishment request 2 may include second path information. The second path information is used to establish the forwarding path between the source UPF entity and the target UPF entity.

The second path information in this embodiment of this application may include the first N9 tunnel uplink information of the target UPF entity. Optionally, the second path information in this embodiment of this application may further include the first N9 tunnel downlink information of the source UPF entity.

Optionally, the N4 session establishment request 2 may further include first tunnel deletion indication information. The first tunnel deletion indication information is used to instruct to delete an N3 tunnel of the source UPF entity or set the N3 tunnel of the source UPF entity to invalid. The N3 tunnel of the source UPF entity is a tunnel between the source UPF entity and the source base station.

Optionally, the N4 session establishment request 2 may further include second tunnel deletion indication information. The second tunnel deletion indication information is used to instruct to delete a second N9 tunnel of the source UPF entity or set the second N9 tunnel of the source UPF entity to invalid. The second N9 tunnel of the source UPF entity is a tunnel between the source UPF entity and the A-UPF entity.

In addition, the N4 session establishment request 2 may further include other user plane information of the current PDU session, for example, the data packet statistics collection and reporting rule and the QoS rule. This is not specifically limited in this embodiment of this application.

Optionally, the information included in the N4 session establishment request 2 may be sent to the source UPF entity using different messages. This is not specifically limited in this embodiment of this application.

S607. The source UPF entity sends a session establishment response 2 to the SMF entity, such that the SMF entity receives the session establishment response 2 from the source UPF entity.

It should be noted that, if both the first path information in step S604 and the second path information in step S606 include the first N9 tunnel downlink information of the source UPF entity and the first N9 tunnel uplink information of the target UPF entity, the first path information may be the same as the second path information. Certainly, alternatively, the first path information in step S604 may be different from the second path information in step S606. For example, the first path information includes only the first N9 tunnel downlink information of the source UPF entity, and the second path information includes only the first N9 tunnel uplink information of the target UPF entity. This is not specifically limited in this embodiment of this application.

S608. The SMF entity sends an N4 session establishment request 3 to the A-UPF entity, such that the A-UPF entity receives the N4 session establishment request 3 from the SMF entity.

Optionally, the N4 session establishment request 3 may include the fourth routing rule. The fourth routing rule includes that data whose destination address is the address of the terminal is sent to the target UPF entity.

Optionally, the N4 session establishment request 3 may include fourth path information. The fourth path information is used to establish the forwarding path between the A-UPF entity and the target UPF entity.

The fourth path information in this embodiment of this application may include the second N9 tunnel uplink information of the target UPF entity. Optionally, the fourth path information in this embodiment of this application may further include the second N9 tunnel downlink information of the A-UPF entity.

Optionally, the N4 session establishment request 3 may further include second tunnel deletion indication information. The second tunnel deletion indication information is used to instruct to delete a first N9 tunnel of the A-UPF entity or set the first N9 tunnel of the A-UPF entity to invalid. The first N9 tunnel of the A-UPF entity is a tunnel between the source UPF entity and the A-UPF entity.

In addition, the N4 session establishment request 3 may further include other user plane information of the current PDU session, for example, the data packet statistics collection and reporting rule and the QoS rule. This is not specifically limited in this embodiment of this application.

Optionally, the information included in the N4 session establishment request 3 may be sent to the source UPF entity using different messages. This is not specifically limited in this embodiment of this application.

S609. The A-UPF entity sends a session establishment response 3 to the SMF entity, such that the SMF entity receives the session establishment response 3 from the A-UPF entity.

It should be noted that, if both the third path information in step S604 and the fourth path information in step S608 include the second N9 tunnel downlink information of the A-UPF entity and the second N9 tunnel uplink information of the target UPF entity, the third path information may be the same as the fourth path information. Certainly, alternatively, the third path information in step S604 may be different from the fourth path information in step S608. For example, the third path information includes only the second N9 tunnel downlink information of the A-UPF entity, and the fourth path information includes only the second N9 tunnel uplink information of the target UPF entity. This is not specifically limited in this embodiment of this application.

S610. The SMF entity sends a path switch response to the target base station, such that the target base station receives the path switch response from the SMF entity.

Optionally, the path switch response may include eighth path information. The eighth path information is used to establish the forwarding path between the target base station and the target UPF entity.

The eighth path information in this embodiment of this application may include the N3 tunnel downlink information of the target UPF entity. Optionally, the eighth path information in this embodiment of this application may further include the N3 tunnel uplink information of the target base station.

In addition, the path switch response may further include other user plane information of the current PDU session, for example, the data packet statistics collection and reporting rule and the QoS rule. This is not specifically limited in this embodiment of this application.

Optionally, the information included in the path switch response may be sent to the target base station using different messages. This is not specifically limited in this embodiment of this application.

It should be noted that, if both the seventh path information in step S604 and the eighth path information in step S610 include the N3 tunnel downlink information of the target UPF entity and the N3 tunnel uplink information of the target base station, the seventh path information may be the same as the eighth path information. Certainly, alternatively, the seventh path information in step S604 may be different from the eighth path information in step S610. For example, the seventh path information includes only the N3 tunnel uplink information of the target base station, and the second path information includes only the N3 tunnel downlink information of the target UPF entity. This is not specifically limited in this embodiment of this application.

S611. The target base station releases a source base station resource.

For an implementation of releasing the source base station resource by the target base station, refer to an existing solution. Details are not described herein.

In conclusion, step S604 to step S611 may be performed to delete the tunnel between the source UPF entity and the source base station and the tunnel between the source UPF entity and the A-UPF entity.

Step S604 to step S611 may be performed to establish: the tunnel between the source UPF entity and the target UPF entity and the tunnel between the target UPF entity and the A-UPF entity.

In other words, the target UPF entity can be added to the current PDU session by performing step S604 to step S611. In this way, communication between the terminal and the AS 1 can be maintained. In this case, the target UPF entity may be considered as a common hop of UPF entity on a PDU session path. Corresponding service transmission paths are:

the terminal <-> the target base station <-> the target UPF entity <-> the source UPF entity <-> the AS 1; and the terminal <-> the target base station <-> the target UPF entity <-> the A-UPF entity <-> the A-DN.

It should be noted that there is no necessary sequence for performing steps S604 and S605, steps S606 and S607, and steps S608 and S609. Any group of steps in steps S604 and S605, steps S606 and S607, and steps S608 and S609 may be first performed, then any group of steps in the other two groups of steps may be performed, and finally the last group of steps may be performed. For example, steps S604 and S605 may be performed first, then steps S606 and S607 may be performed, and finally steps S608 and S609 may be performed. Certainly, alternatively, steps S604 and S605, steps S606 and S607, and steps S608 and S609 may be performed simultaneously. This is not specifically limited in this embodiment of this application.

It should be noted that step S604 to step S610 are described using an example in which an N9 tunnel (including the tunnel between the source UPF entity and the target UPF entity and the tunnel between the target UPF entity and the A-UPF entity) is an N9 tunnel at a session granularity. Certainly, alternatively, the N9 tunnel may be an N9 tunnel at a device granularity. This is not specifically limited in this embodiment of this application.

When the N9 tunnel is the N9 tunnel at a device granularity, if no N9 tunnel at a device granularity exists, the N9 tunnel at a device granularity is established in the foregoing manner of establishing the N9 tunnel at a session granularity.

If the N9 tunnel at a device granularity exists, the N9 tunnel at a device granularity may not need to be established, and only a routing rule corresponding to the PDU session is delivered. For example, the SMF entity sends the second routing rule to the target UPF entity, such that the target UPF entity can send the data whose destination address is the address of the AS 1 to the source UPF entity through the tunnel between the source UPF entity and the target UPF entity. Alternatively, for example, the SMF entity sends the fourth routing rule to the source UPF entity, such that the source UPF entity may send the data whose destination address is the address of the terminal to the target UPF entity through the tunnel between the source UPF entity and the target UPF entity. Alternatively, for example, the SMF entity sends the third routing rule to the target UPF entity, such that the target UPF entity may send the data whose destination address is the address of the A-DN to the A-UPF entity through the tunnel between the target UPF entity and the A-UPF entity. Alternatively, for example, the SMF entity sends the fourth routing rule to the A-UPF entity, such that the A-UPF entity may send the data whose destination address is the address of the terminal to the target UPF entity through the tunnel between the target UPF entity and the A-UPF entity.

When the N9 tunnel is the N9 tunnel at a device granularity, the N9 tunnel at a device granularity usually does not exist, and needs to be newly established in the following scenarios:

1. the source UPF entity or the target UPF entity is powered on;
2. a $1^{st}$ routing rule corresponding to the N9 tunnel at a device granularity needs to be established; and
3. other cases.

S612. The SMF entity sends a first message to the AS controller, such that the AS controller receives the first message from the SMF entity.

Optionally, the first message in this embodiment of this application may be a PDU session change message.

Optionally, in this embodiment of this application, the first message may include at least one of location information of the target UPF entity or location information of the terminal. At least one of the location information of the target UPF entity or the location information of the terminal is used to determine that an AS serving the terminal is the AS 2.

Optionally, the SMF entity may determine, according to a local policy, that the first message needs to be sent to the AS controller. The local policy may include a service type or a 5G QoS identifier (5QI).

Alternatively, the SMF entity may subscribe to such a type of message. Further, after the UPF entity changes, the SMF entity is triggered to send the first message to the AS controller. This is not specifically limited in this embodiment of this application.

Optionally, in this embodiment of this application, the SMF entity may directly communicate with the AS controller, or may communicate with the AS controller using a network exposure function (NEF) entity or a policy control function (PCF) entity. A general description is provided herein, and details are not described below again.

It should be noted that there is no necessary sequence for performing step S612 and steps S604 to S611. Step S612 may be performed before steps S604 to S611. Alternatively, steps S604 to S611 may be performed before step S612. Alternatively, step S612 and steps S604 to S611 may be performed simultaneously. This is not specifically limited in this embodiment of this application.

S613. The AS controller determines, based on the first message, that the AS serving the terminal is the AS 2.

Optionally, the AS controller may determine, based on at least one of the location information of the target UPF entity or the location information of the terminal included in the first message, that the AS serving the terminal is the AS 2.

S614. The AS controller sends an AS synchronization request to the AS 1, such that the AS 1 receives the AS synchronization request from the AS controller, where the AS synchronization request is used to request the AS 1 to synchronize information about the terminal to the AS 2.

The synchronized information about the terminal may include service authentication information, historical data, a context, and the like. This is not specifically limited in this embodiment of this application.

It should be noted that the AS synchronization request in this embodiment of this application may also have another name, and the name does not constitute a limitation on the message. For example, the AS synchronization request may also be referred to as an AS handover request. A general description is provided herein, and details are not described below again.

S615. The AS 1 synchronizes the information about the terminal to the AS 2.

S616. The AS 1 sends an AS synchronization response to the AS controller, such that the AS controller receives the AS synchronization response from the AS 1, where the synchronization response is used to indicate that synchronization between the AS 1 and the AS 2 has been completed.

Optionally, the AS 2 may send an AS synchronization response to the AS controller, such that the AS controller receives the AS synchronization response from the AS 2, where the AS synchronization response is used to indicate that synchronization between the AS 1 and the AS 2 has been completed. This is not specifically limited in this embodiment of this application.

It should be noted that the AS synchronization response in this embodiment of this application may also have another name, and the name does not constitute a limitation on the message. For example, the AS synchronization response may also be referred to as an AS handover response. A general description is provided herein, and details are not described below again.

S617. The AS controller sends indication information of the AS 2 to the SMF entity, such that the SMF entity receives the indication information of the AS 2 from the AS controller.

Optionally, the indication information of the AS 2 may be location information of the AS 2.

S618. The SMF entity sends an offloading rule update request to the target UPF entity, such that the target UPF entity receives the offloading rule update request from the SMF entity, where the offloading rule update request includes a first routing rule, and the first routing rule includes that data whose destination address is an address of the AS 2 is sent to the AS 2.

Further, after receiving the offloading rule update request from the SMF entity, the target UPF entity may add the first routing rule to a local offloading rule. In this way, the target UPF entity can send the data whose destination address is the address of the AS 2 to the AS 2. This prevents the target UPF entity from sending the data that is to be sent to the address of the AS 2 first to the A-UPF entity according to a ULCL default rule and then to the AS 2 using the A-DN. Therefore, a path from the terminal to the AS 2 is shortest, and latency is controllable.

In addition, the local offloading rule of the target UPF entity further includes the second routing rule and the third routing rule. Therefore, the target UPF entity still transmits data according to the service transmission paths in step S610, that is, still sends the data whose destination address is the AS 1 to the source UPF entity, and sends another data packet to the A-UPF entity according to a default rule. This is not specifically limited in this embodiment of this application.

In this case, corresponding service transmission paths are:

the terminal <-> the target base station <-> the target UPF entity <-> the AS 2;

the terminal <-> the target base station <-> the target UPF entity <-> the source UPF entity <-> the AS 1; and the terminal <-> the target base station <-> the target UPF entity <-> the A-UPF entity <-> the A-DN.

S619. The target UPF entity sends an offloading rule update response to the SMF entity, such that the AS controller receives the offloading rule update response from the SMF entity, where the offloading rule update response is used to indicate that the local offloading rule has been established and that a network-side path has been ready.

S620. The SMF entity sends a seventh message to the AS controller, such that the AS controller receives the seventh message from the SMF entity, where the seventh message is used to instruct to switch the terminal from the AS 1 to the AS 2.

S621. The AS controller switches the terminal from the AS 1 to the AS 2 based on the seventh message.

S622. The AS controller sends an eighth message to the SMF entity, such that the SMF entity receives the eighth message from the AS controller, where the eighth message is used to indicate that the terminal has been switched from the AS 1 to the AS 2.

S623. The SMF entity sends an N4 session modification request to the target UPF entity, such that the target UPF entity receives the N4 session modification request from the SMF entity.

Optionally, when the N9 tunnel is the N9 tunnel at a session granularity, the N4 session modification request may include first indication information, where the first indication information is used to instruct to delete the second routing rule and the first path information, that is, delete the tunnel between the source UPF entity and the target UPF entity.

Optionally, when the N9 tunnel is the N9 tunnel at a device granularity, there are the following two possible implementation manners.

Manner 1: On the target UPF entity, in addition to the second routing rule, if there is another routing rule corresponding to the tunnel between the source UPF entity and the target UPF entity, the N4 session modification request may include second indication information, where the second indication information is used to instruct to delete the second routing rule.

Alternatively, on the target UPF entity, if there is no other routing rule corresponding to the tunnel between the source UPF entity and the target UPF entity except the second routing rule, the N4 session modification request may include first indication information, where the first indication information is used to instruct to delete the second routing rule and the first path information, that is, delete the tunnel between the source UPF entity and the target UPF entity.

Manner 2: On the target UPF entity, in addition to the second routing rule, regardless of whether there is another routing rule corresponding to the tunnel between the source UPF entity and the target UPF entity, the N4 session modification request includes only second indication information, where the second indication information is used to instruct to delete the second routing rule. In other words, when the N9 tunnel is the tunnel at a device granularity, and a user plane resource is released, the tunnel at a device granularity is not released, and only the routing rule corresponding to the current PDU session is deleted.

For related descriptions of the second routing rule and the first path information, refer to step S604. Details are not described herein again.

Optionally, the information included in the N4 session modification request may be sent to the target UPF entity using different messages. This is not specifically limited in this embodiment of this application.

S624. The target UPF entity sends an N4 session modification response to the SMF entity, such that the SMF entity receives the N4 session modification response from the target UPF entity.

S625. The SMF entity sends an N4 session release request to the source UPF entity, such that the source UPF entity receives the N4 session release request from the SMF entity.

The N4 session release request is used to request to delete user plane information, corresponding to the terminal, on the source UPF entity.

Optionally, when the N9 tunnel is the N9 tunnel at a session granularity, the N4 session release request may include third indication information, where the third indication information is used to instruct to delete the fourth routing rule and the second path information, that is, delete the tunnel between the source UPF entity and the target UPF entity.

Optionally, when the N9 tunnel is the N9 tunnel at a device granularity, there are the following two possible implementation manners.

Manner 1: On the source UPF entity, in addition to the fourth routing rule, if there is another routing rule corresponding to the tunnel between the source UPF entity and the target UPF entity, the N4 session release request may include fourth indication information, where the fourth indication information is used to instruct to delete the fourth routing rule.

Alternatively, on the source UPF entity, if there is no other routing rule corresponding to the tunnel between the source UPF entity and the target UPF entity except the fourth routing rule, the N4 session release request may include third indication information, where the third indication information is used to instruct to delete the fourth routing rule and the second path information, that is, delete the tunnel between the source UPF entity and the target UPF entity.

Manner 2: On the source UPF entity, in addition to the fourth routing rule, regardless of whether there is another routing rule corresponding to the tunnel between the source UPF entity and the target UPF entity, the N4 session release request includes only fourth indication information, where the fourth indication information is used to instruct to delete the fourth routing rule. In other words, when the N9 tunnel is the tunnel at a device granularity, and a user plane resource is released, the tunnel at a device granularity is not released, and only the routing rule corresponding to the current PDU session is deleted.

For related descriptions of the fourth routing rule and the second path information, refer to step S606. Details are not described herein again.

Optionally, in addition to the fourth routing rule and the second path information, the user plane information corresponding to the terminal may further include a packet detection rule, a QoS rule, and the like. This is not specifically limited in this embodiment of this application.

Optionally, the information included in the N4 session release request may be sent to the source UPF entity using different messages. This is not specifically limited in this embodiment of this application.

S626. The source UPF entity sends an N4 session release response to the SMF entity, such that the SMF entity receives the N4 session release response from the source UPF entity.

In conclusion, step S623 to step S626 may be performed to delete the tunnel between the source UPF entity and the target UPF entity. In this case, communication between the terminal and the AS 1 ends. Corresponding service transmission paths are:

the terminal <-> the target base station <-> the target UPF entity <-> the AS 2; and the terminal <-> the target base station <-> the target UPF entity <-> the A-UPF entity <-> the A-DN.

It should be noted that there is no necessary sequence for performing steps S623 and S624 and steps S625 and S626. Steps S623 and S624 may be performed before steps S625 and S626. Alternatively, steps S625 and S626 may be performed before steps S623 and S624. Alternatively, steps S623 and S624 and steps S625 and S626 may be performed simultaneously. This is not specifically limited in this embodiment of this application.

According to the service continuity implementation method provided in this embodiment of this application, in one aspect, after the SMF entity selects the target UPF entity to serve the terminal, the SMF entity may receive the indication information of the AS 2, and send the first routing rule to the target UPF entity based on the indication information of the AS 2, such that the target UPF entity can transmit service data according to the first routing rule after the terminal is switched from the AS 1 to the AS 2. In addition, before the terminal is switched from the AS 1 to the AS 2, the SMF entity may continue to maintain a service connection between the terminal and the AS 1. Therefore, seamless service data handover can be implemented in a scenario in which both a handover of the UPF entity and a handover of the AS entity occur, to ensure service continuity in a handover process. In another aspect, the first routing rule is that the data whose destination address is the AS 2 is sent to the AS 2. This can prevent the target UPF entity from routing the data that is to be sent to the address of the AS 2 first to the A-DN and then to the AS 2. Therefore, the path from the terminal to the AS 2 is shortest, and the latency is controllable.

The actions of the SMF entity in steps S603, S604, S606, S608, S610, S612, S618, S620, S621, S623, and S625 may be performed by the processor 401 in the communications device 400 shown in FIG. 4 by invoking the application program code stored in the memory 403. This is not limited in this embodiment of this application.

The actions of the AS controller in steps S613, S614, S617, S621, and S622 may be performed by the processor 401 in the communications device 400 shown in FIG. 4 by invoking the application program code stored in the memory 403. This is not limited in this embodiment of this application.

Figure 7A:
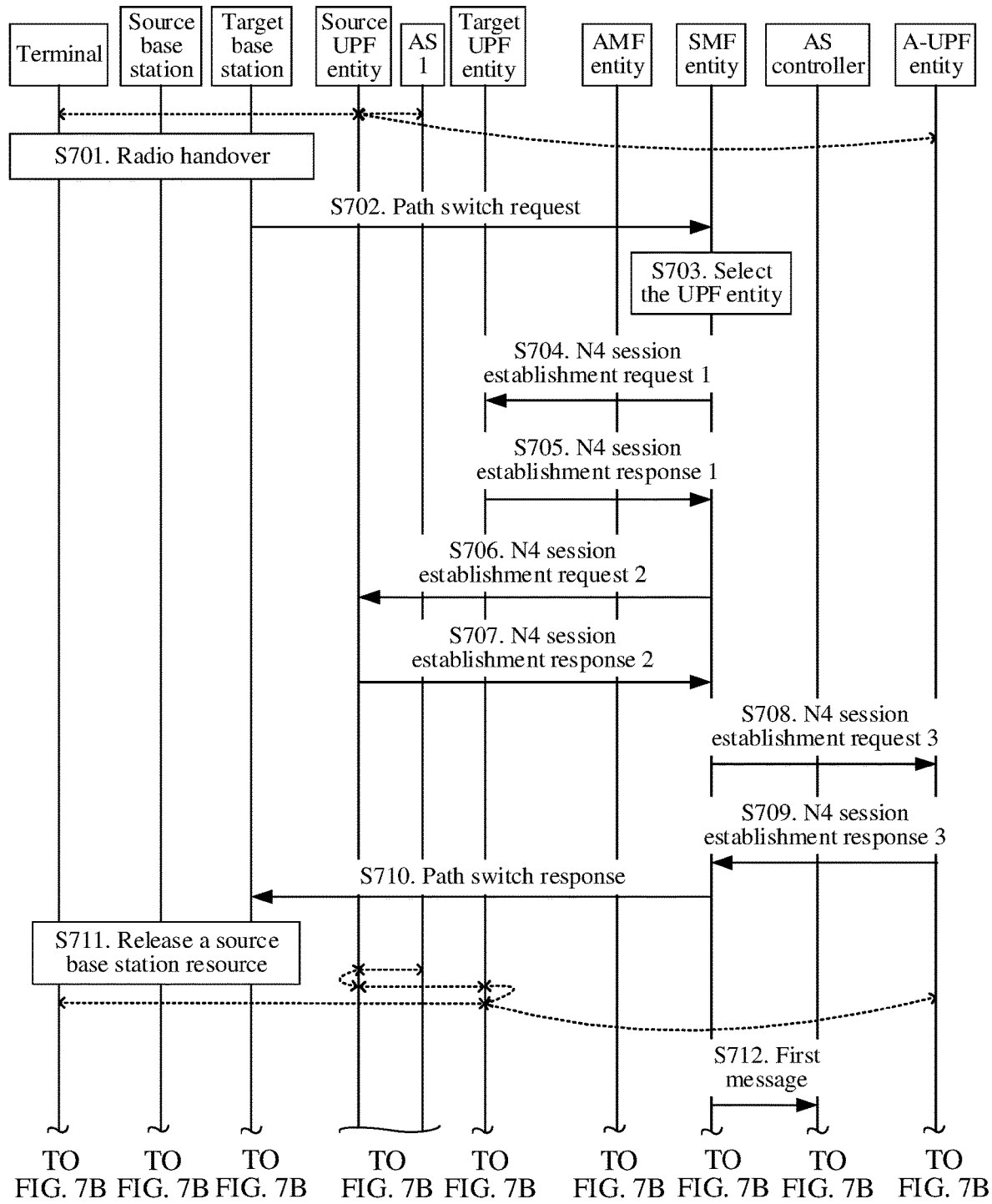
FIG. 7A and FIG. 7B are third schematic flowcharts of a service continuity implementation method according to an embodiment of this application.
Figure 7B:
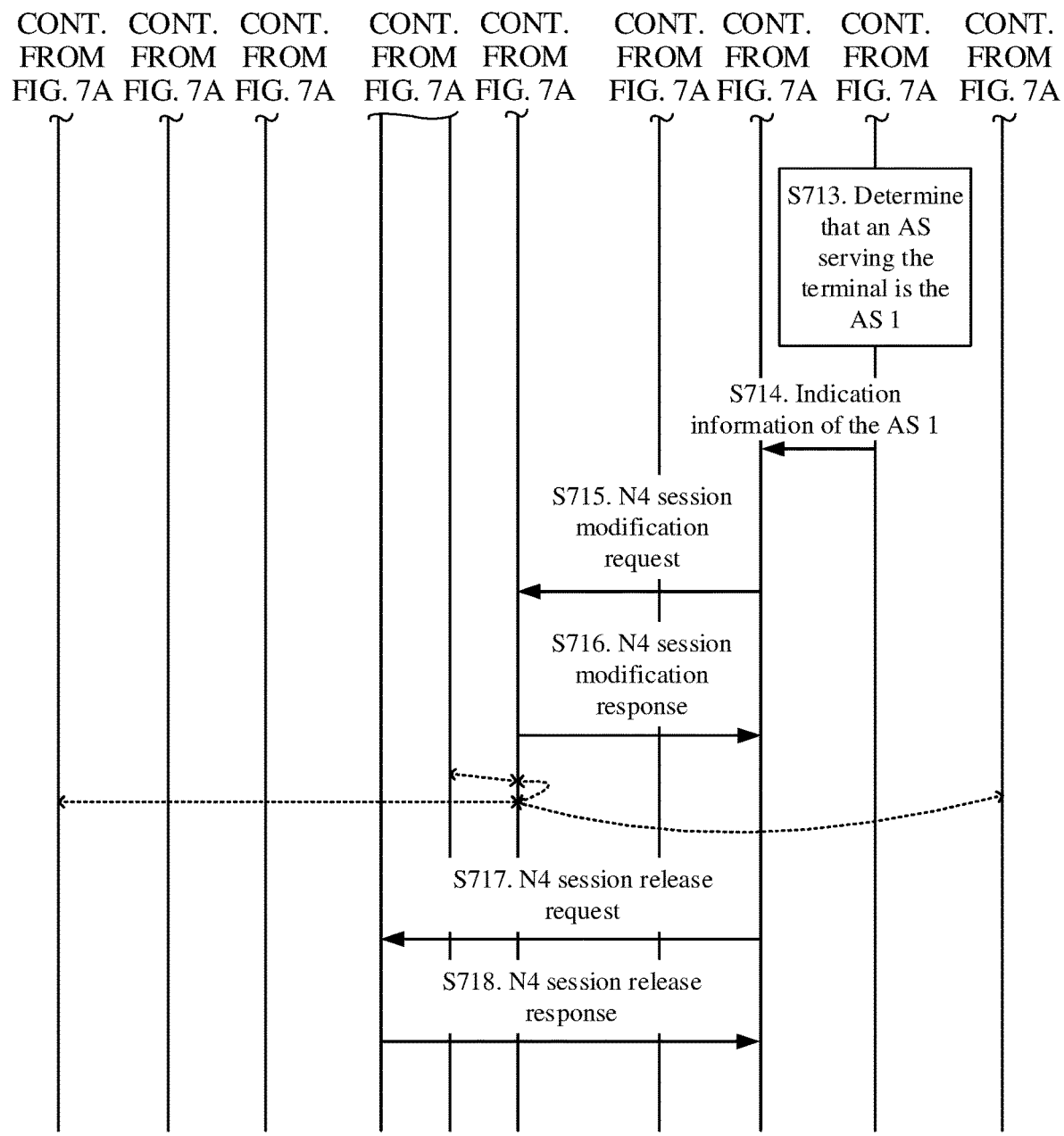

Optionally, it is assumed that in an initial state, a terminal communicates with an AS 1 using an access device (assumed to be a source base station herein) and a local UPF entity 2 (referred to as a source UPF entity herein). In addition, the terminal communicates with a remote DN (referred to as an A-DN herein) using the source UPF entity and a remote UPF entity (referred to as an A-UPF entity herein). FIG. 7A and FIG. 7B are a schematic flowchart of another service continuity implementation method according to an embodiment of this application. Interactions between the terminal, the source base station, a target base station, the source UPF entity, a local UPF entity 1 (referred to as a target UPF entity herein), the A-UPF entity, an AMF entity, an SMF entity, an AS controller, and the AS 1 are involved, and the following steps are included.

Steps S701 to S712 are the same as steps S601 to S612. For details, refer to the embodiment shown in FIG. 6A and FIG. 6B. Details are not described herein again.

S713. The AS controller determines, based on the first message, that the AS serving the terminal is the AS 1.

Optionally, the AS controller may determine, based on at least one of the location information of the target UPF entity or the location information of the terminal included in the first message, that the AS serving the terminal is the AS 1.

S714. The AS controller sends indication information of the AS 1 to the SMF entity, such that the SMF entity receives the indication information of the AS 1 from the AS controller.

Optionally, the indication information of the AS 1 may be location information of the AS 1, identifier information of the AS 1, information indicating that the AS 1 does not change, or the like. This is not specifically limited in this embodiment of this application.

After receiving the indication information of the AS 1 from the AS controller, the SMF entity may determine, based on the indication information of the AS 1, that a handover of the AS does not occur. For example, if the indication information of the AS 1 is the location information of the AS 1, the location information of the AS 1 may be compared with location information of a current AS; and if the location information of the AS 1 is the same as the location information of the current AS, it is determined that the handover of the AS does not occur.

S715. The SMF entity sends an N4 session modification request to the target UPF entity, such that the target UPF entity receives the N4 session modification request from the SMF entity.

The N4 session modification request includes a first routing rule. The first routing rule includes that data whose destination address is an address of the AS 1 is sent to the AS 1. Further, after receiving the first routing rule from the SMF entity, the target UPF entity may add the first routing rule to a local offloading rule.

Optionally, when the N9 tunnel is the N9 tunnel at a session granularity, the N4 session modification request may include first indication information, where the first indication information is used to instruct to delete the second routing rule and the first path information, that is, delete the tunnel between the source UPF entity and the target UPF entity.

Optionally, when the N9 tunnel is the N9 tunnel at a device granularity, there are the following two possible implementation manners.

Manner 1: On the target UPF entity, in addition to the second routing rule, if there is another routing rule corresponding to the tunnel between the source UPF entity and the target UPF entity, the N4 session modification request may include second indication information, where the second indication information is used to instruct to delete the second routing rule.

Alternatively, on the target UPF entity, if there is no other routing rule corresponding to the tunnel between the source UPF entity and the target UPF entity except the second routing rule, the N4 session modification request may include first indication information, where the first indication information is used to instruct to delete the second routing rule and the first path information, that is, delete the tunnel between the source UPF entity and the target UPF entity.

Manner 2: On the target UPF entity, in addition to the second routing rule, regardless of whether there is another routing rule corresponding to the tunnel between the source UPF entity and the target UPF entity, the N4 session modification request includes only second indication information, where the second indication information is used to instruct to delete the second routing rule. In other words, when the N9 tunnel is the tunnel at a device granularity, and a user plane resource is released, the tunnel at a device granularity is not released, and only the routing rule corresponding to the current PDU session is deleted.

For related descriptions of the second routing rule and the first path information, refer to step S704. Details are not described herein again.

Optionally, the information included in the N4 session modification request may be sent to the target UPF entity using different messages. This is not specifically limited in this embodiment of this application.

S716. The target UPF entity sends an N4 session modification response to the SMF entity, such that the SMF entity receives the N4 session modification response from the target UPF entity.

The first indication information or the second indication information in step S715 is used to instruct to delete the second routing rule. Therefore, the target UPF entity can directly send the data whose destination address is the address of the AS 1 to the AS 1, without forwarding by the source UPF entity. In this way, a path from the terminal to the AS 1 is shortest, and latency is controllable.

In addition, the local offloading rule of the target UPF entity further includes the third routing rule. Therefore, the target UPF entity still sends another data packet to the A-UPF entity according to a default rule. This is not specifically limited in this embodiment of this application.

In this case, corresponding service transmission paths are:
the terminal <-> the target base station <-> the target UPF entity <-> the AS 1; and
the terminal <-> the target base station <-> the target UPF entity <-> the A-UPF entity <-> the A-DN.

S717. The SMF entity sends an N4 session release request to the source UPF entity, such that the source UPF entity receives the N4 session release request from the SMF entity.

The N4 session release request is used to request to delete user plane information, corresponding to the terminal, on the source UPF entity.

Optionally, when the N9 tunnel is the N9 tunnel at a session granularity, the N4 session modification request may include third indication information, where the third indication information is used to instruct to delete the fourth routing rule and the second path information, that is, delete the tunnel between the source UPF entity and the target UPF entity.

Optionally, when the N9 tunnel is the N9 tunnel at a device granularity, there are the following two possible implementation manners.

Manner 1: On the source UPF entity, in addition to the fourth routing rule, if there is another routing rule corresponding to the tunnel between the source UPF entity and the target UPF entity, the N4 session release request may include fourth indication information, where the fourth indication information is used to instruct to delete the fourth routing rule.

Alternatively, on the source UPF entity, if there is no other routing rule corresponding to the tunnel between the source UPF entity and the target UPF entity except the fourth routing rule, the N4 session release request may include third indication information, where the third indication information is used to instruct to delete the fourth routing rule and the second path information, that is, delete the tunnel between the source UPF entity and the target UPF entity.

Manner 2: On the source UPF entity, in addition to the fourth routing rule, regardless of whether there is another routing rule corresponding to the tunnel between the source UPF entity and the target UPF entity, the N4 session release request includes only fourth indication information, where the fourth indication information is used to instruct to delete the fourth routing rule. In other words, when the N9 tunnel is the tunnel at a device granularity, and a user plane resource is released, the tunnel at a device granularity is not released, and only the routing rule corresponding to the current PDU session is deleted.

For related descriptions of the fourth routing rule and the second path information, refer to step S706. Details are not described herein again.

Optionally, in addition to the fourth routing rule and the second path information, the user plane information corresponding to the terminal may further include a packet detection rule, a QoS rule, and the like. This is not specifically limited in this embodiment of this application.

Optionally, the information included in the N4 session release request may be sent to the source UPF entity using different messages. This is not specifically limited in this embodiment of this application.

S718. The source UPF entity sends an N4 session release response to the SMF entity, such that the SMF entity receives the N4 session release response from the source UPF entity.

Step S715 to step S718 may be performed to delete the tunnel between the source UPF entity and the target UPF entity.

It should be noted that there is no necessary sequence for performing steps S715 and S716 and steps S717 and S718. Steps S717 and S718 may be performed before steps S715 and S716. Alternatively, steps S715 and S716 may be performed before steps S717 and S718.

Alternatively, steps S715 and S716 and steps S717 and S718 may be performed simultaneously. This is not specifically limited in this embodiment of this application.

According to the service continuity implementation method provided in this embodiment of this application, in one aspect, after the SMF entity selects the target UPF entity to serve the terminal, the SMF entity may receive the indication information of the AS 1, and send the first routing rule to the target UPF entity based on the indication information of the AS 1, such that the target UPF entity can transmit service data according to the first routing rule. In addition, before the AS controller determines whether the handover of the AS occurs, the SMF entity may continue to maintain a service connection between the terminal and the AS 1. Therefore, seamless service data handover can be implemented in a scenario in which a handover of the UPF entity occurs, to ensure service continuity in a handover process. In another aspect, the first routing rule is that the data whose destination address is the AS 1 is sent to the AS 1. This can prevent the target UPF entity from routing the data that is to be sent to the address of the AS 1 first to the A-DN and then to the AS 1. Therefore, the path from the terminal to the AS 1 is shortest, and the latency is controllable.

The actions of the SMF entity in steps S703, S704, S706, S708, S710, S712, S715, and S717 may be performed by the processor 401 in the communications device 400 shown in FIG. 4 by invoking the application program code stored in the memory 403. This is not limited in this embodiment of this application.

The actions of the AS controller in steps S713 and S714 may be performed by the processor 401 in the communications device 400 shown in FIG. 4 by invoking the application program code stored in the memory 403. This is not limited in this embodiment of this application.

The following describes in detail the service continuity implementation method shown in FIG. 5 using an example in which the service continuity implementation system 10 shown in FIG. 1 is applied to the scenario 2 shown in FIG. 3.

Figure 8A:
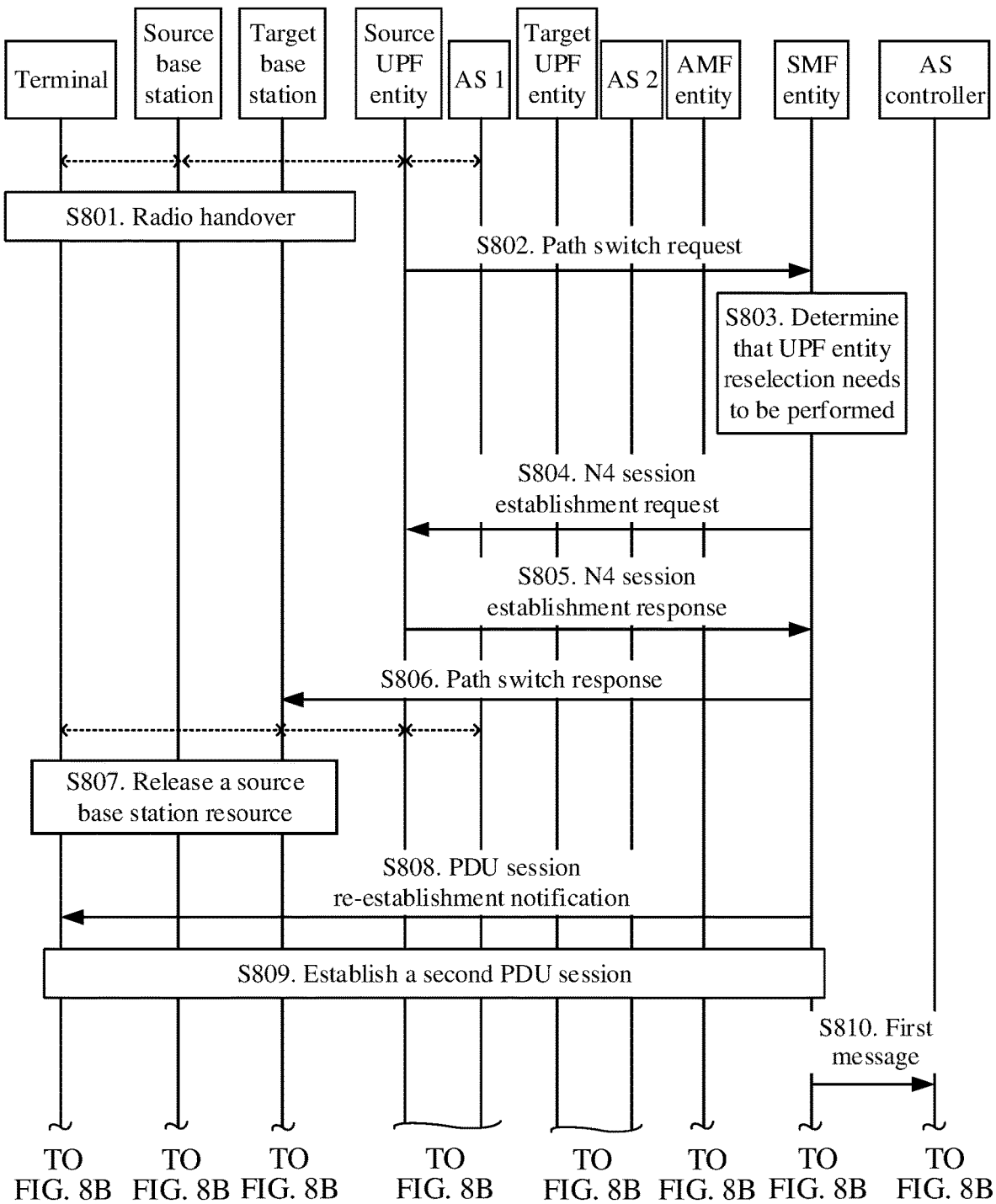
FIG. 8A and FIG. 8B are fourth schematic flowcharts of a service continuity implementation method according to an embodiment of this application.
Figure 8B:
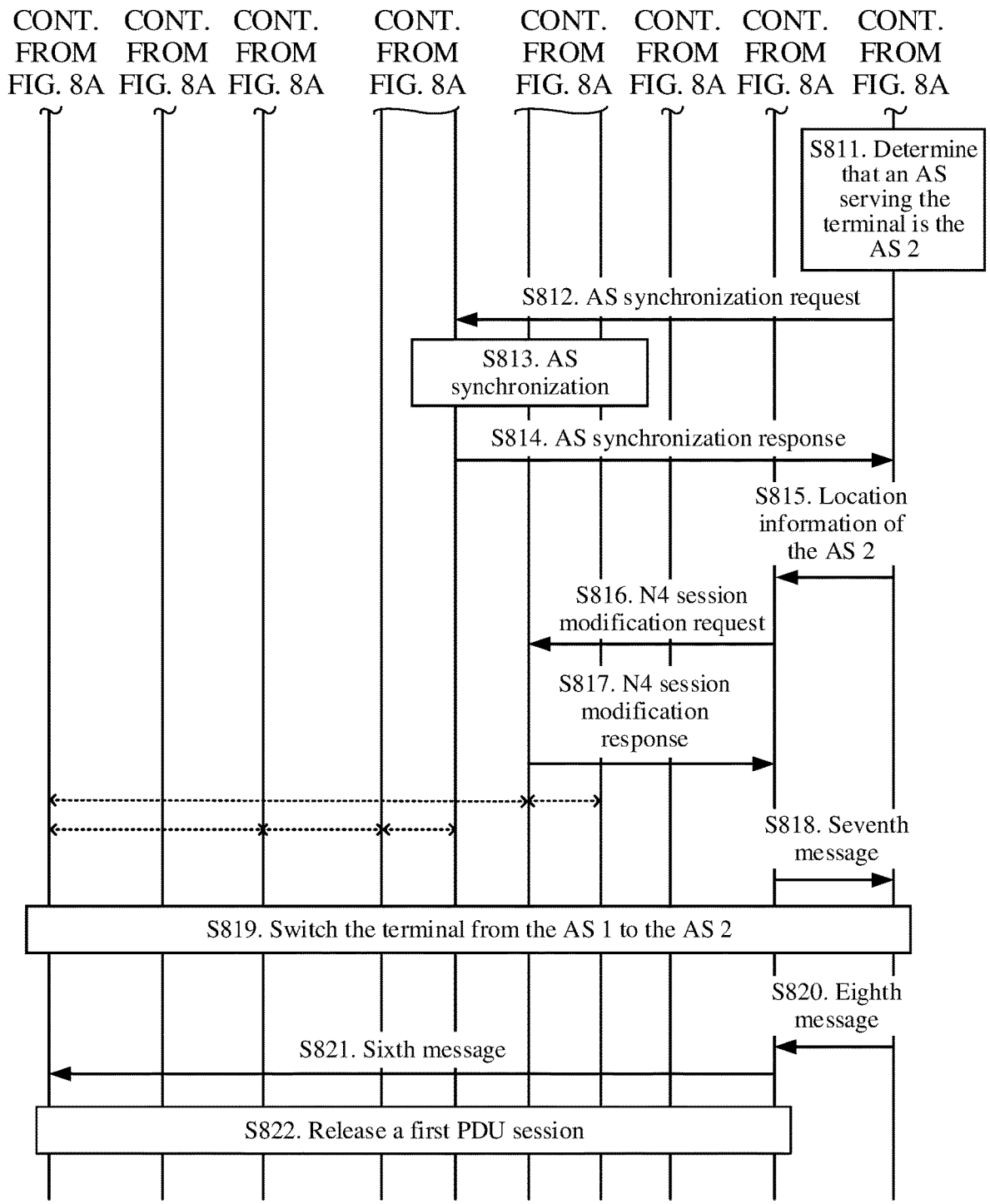

It is assumed that in an initial state, a terminal communicates with an AS 1 using an access device (assumed to be a source base station herein) and a UPF entity 2 (referred to as a source UPF entity herein). FIG. 8A and FIG. 8B are schematic flowcharts of a service continuity implementation method according to an embodiment of this application. Interactions between the terminal, the source base station, a target base station, the source UPF entity, a UPF entity 1 (referred to as a target UPF entity herein), an AMF entity, an SMF entity, an AS controller, the AS 1, and an AS 2 are involved, and the following steps are included.

Steps S801 and S802 are the same as steps S601 and S602. For details, refer to the embodiment shown in FIG. 6A and FIG. 6B. Details are not described herein again.

S803. The SMF entity determines that UPF entity reselection needs to be performed.

Optionally, if a location of the terminal goes beyond a service range of the source UPF entity, the SMF entity may determine that local UPF entity reselection needs to be performed.

S804. The SMF entity sends an N4 session establishment request to the source UPF entity, such that the source UPF entity receives the N4 session establishment request from the SMF entity.

Optionally, the N4 session establishment request may include a fifth routing rule. The fifth routing rule includes that data whose destination address is an address of the terminal is sent to the target base station.

Optionally, the N4 session establishment request may include ninth path information. The ninth path information is used to establish a forwarding path between the source UPF entity and the base station.

The ninth path information in this embodiment of this application may include N3 tunnel uplink information of the target base station in the path switch request in step S802. Optionally, the ninth path information in this embodiment of this application may further include N3 tunnel downlink information of the source UPF entity. An N3 tunnel of the source UPF entity and an N3 tunnel of the target base station are tunnels between the source UPF entity and the target base station. The N3 tunnel uplink information of the target base station may include an endpoint address of the N3 tunnel of the target base station on the target base station side, an address of the target base station, and the like. This is not specifically limited in this embodiment of this application. The N3 tunnel downlink information of the source UPF entity may include an endpoint address of the N3 tunnel of the source UPF entity on the source UPF entity side, an address of the source UPF entity, and the like. This is not specifically limited in this embodiment of this application. The N3 tunnel downlink information of the source UPF entity may be allocated by the SMF entity, or may be allocated by the source UPF entity. This is not specifically limited in this embodiment of this application.

Optionally, the N4 session establishment request may further include first tunnel deletion indication information. The first tunnel deletion indication information is used to instruct to delete the N3 tunnel of the source UPF entity or set the N3 tunnel of the source UPF entity to invalid. The N3 tunnel of the source UPF entity is a tunnel between the source UPF entity and the source base station.

In addition, the N4 session establishment request may further include other user plane information of a current PDU session, for example, a data packet statistics collection and reporting rule and a QoS rule. This is not specifically limited in this embodiment of this application.

Optionally, the information included in the N4 session establishment request may be sent to the source UPF entity using different messages. This is not specifically limited in this embodiment of this application.

S805. The source UPF entity sends a session establishment response to the SMF entity, such that the SMF entity receives the session establishment response from the source UPF entity.

S806. The SMF entity sends a path switch response to the target base station, such that the target base station receives the path switch response from the SMF entity.

Optionally, the path switch response may include tenth path information. The tenth path information is used to establish the forwarding path between the target base station and the source UPF entity.

The tenth path information in this embodiment of this application may include the N3 tunnel downlink information of the source UPF entity. Optionally, the tenth path information in this embodiment of this application may further include the N3 tunnel uplink information of the target base station.

In addition, the path switch response may further include other user plane information of the current PDU session, for example, the data packet statistics collection and reporting rule and the QoS rule. This is not specifically limited in this embodiment of this application.

Optionally, the information included in the path switch response may be sent to the target base station using different messages. This is not specifically limited in this embodiment of this application.

It should be noted that, if both the ninth path information in step S804 and the tenth path information in step S806 include the N3 tunnel downlink information of the source UPF entity and the N3 tunnel uplink information of the target base station, the ninth path information may be the same as the tenth path information. Certainly, alternatively, the ninth path information in step S804 may be different from the tenth path information in step S806. For example, the ninth path information includes only the N3 tunnel uplink information of the target base station, and the tenth path information includes only the N3 tunnel downlink information of the source UPF entity. This is not specifically limited in this embodiment of this application.

S807. The target base station releases a source base station resource.

For an implementation of releasing the source base station resource by the target base station, refer to an existing solution. Details are not described herein.

In conclusion, step S804 to step S807 may be performed to delete the tunnel between the source UPF entity and the source base station.

Step S804 to step S806 may be performed to establish the tunnel between the source UPF entity and the target base station.

In other words, communication between the terminal and the AS 1 can be maintained by performing step S804 to step S807. In this case, a corresponding service transmission path is:

the terminal <-> the target base station <-> the source UPF entity <-> the AS 1.

S808. The SMF entity sends a PDU session re-establishment notification to the terminal, such that the terminal receives the PDU session re-establishment notification from the SMF entity, where the PDU session re-establishment notification includes an identifier of a to-be-re-established PDU session (PDU session ID).

It should be noted that there is no necessary sequence for performing steps S804 to S807 and step S808. Steps S804 to S807 may be performed before step S808. Alternatively, step S808 may be performed before steps S804 to S807. Alternatively, steps S804 to S807 and step S808 may be performed simultaneously. This is not specifically limited in this embodiment of this application.

S809. The terminal initiates a procedure of establishing a new PDU session (referred to as a second PDU session herein), where the SMF entity selects, in a process of establishing the second PDU session, the target UPF entity to serve the terminal.

Optionally, in the process of establishing the second PDU session, the terminal may send an identifier of the second PDU session and an identifier of an old PDU session (referred to as a first PDU session herein) to the SMF entity, such that the SMF entity receives the identifier of the first PDU session and the identifier of the second PDU session from the terminal, and maintains a mapping relationship between the first PDU session and the second PDU session based on the identifier of the first PDU session and the identifier of the second PDU session. This is not specifically limited in this embodiment of this application.

Steps S810 to S815 are the same as steps S612 to S617. For details, refer to the embodiment shown in FIG. 6A and FIG. 6B. Details are not described herein again.

S816. The SMF entity sends an N4 session modification request to the target UPF entity, such that the target UPF entity receives the N4 session modification request from the SMF entity.

The N4 session modification request includes a first routing rule. The first routing rule includes that data whose destination address is an address of the AS 2 is sent to the AS 2.

S817. The target UPF entity sends an N4 session modification response to the SMF entity, such that the SMF entity receives the N4 session modification response from the target UPF entity, where the N4 session modification response is used to indicate that establishment of a bottom-layer network pipeline between the terminal and the AS 2 is completed.

Currently, there are two sessions: the first PDU session and the second PDU session. Therefore, currently, corresponding service transmissionn paths are:

the terminal <-> the target base station <-> the source UPF entity <-> the AS 1, and the terminal <-> the target base station <-> the target UPF entity <-> the AS 2.

Steps S818 to S820 are the same as steps S620 to S622. For details, refer to the embodiment shown in FIG. 6A and FIG. 6B. Details are not described herein again.

S821. The SMF entity sends a sixth message to the terminal, such that the terminal receives the sixth message from the SMF entity, where the sixth message is used to instruct the terminal to release the first PDU session.

S822. The terminal releases the first PDU session based on the sixth message.

For a procedure of releasing the first PDU session by the terminal, refer to other approaches. Details are not described herein.

According to the service continuity implementation method provided in this embodiment of this application, in one aspect, after the SMF entity selects the target UPF entity to serve the terminal, the SMF entity may receive the indication information of the AS 2, and send the first routing rule to the target UPF entity based on the indication information of the AS 2, such that the target UPF entity can transmit service data according to the first routing rule after the terminal is switched from the AS 1 to the AS 2. In addition, before the terminal is switched from the AS 1 to the AS 2, the SMF entity may continue to maintain a service connection between the terminal and the AS 1. Therefore, seamless service data handover can be implemented in a scenario in which both a handover of the UPF entity and a handover of the AS entity occur, to ensure service continuity in a handover process. In another aspect, the first routing rule is that the data whose destination address is the AS 2 is sent to the AS 2. This can prevent the target UPF entity from routing the data that is to be sent to the address of the AS 2 first to a remote DN and then to the AS 2. Therefore, a path from the terminal to the AS 2 is shortest, and latency is controllable.

The actions of the SMF entity in steps S803, S804, S806, S808, S809, S810, S816, S818, S819, S821, and S822 may be performed by the processor 401 in the communications device 400 shown in FIG. 4 by invoking the application program code stored in the memory 403. This is not limited in this embodiment of this application.

The actions of the AS controller in steps S811, S812, S815, S819, and S820 may be performed by the processor 401 in the communications device 400 shown in FIG. 4 by invoking the application program code stored in the memory 403. This is not limited in this embodiment of this application.

Figure 9A:
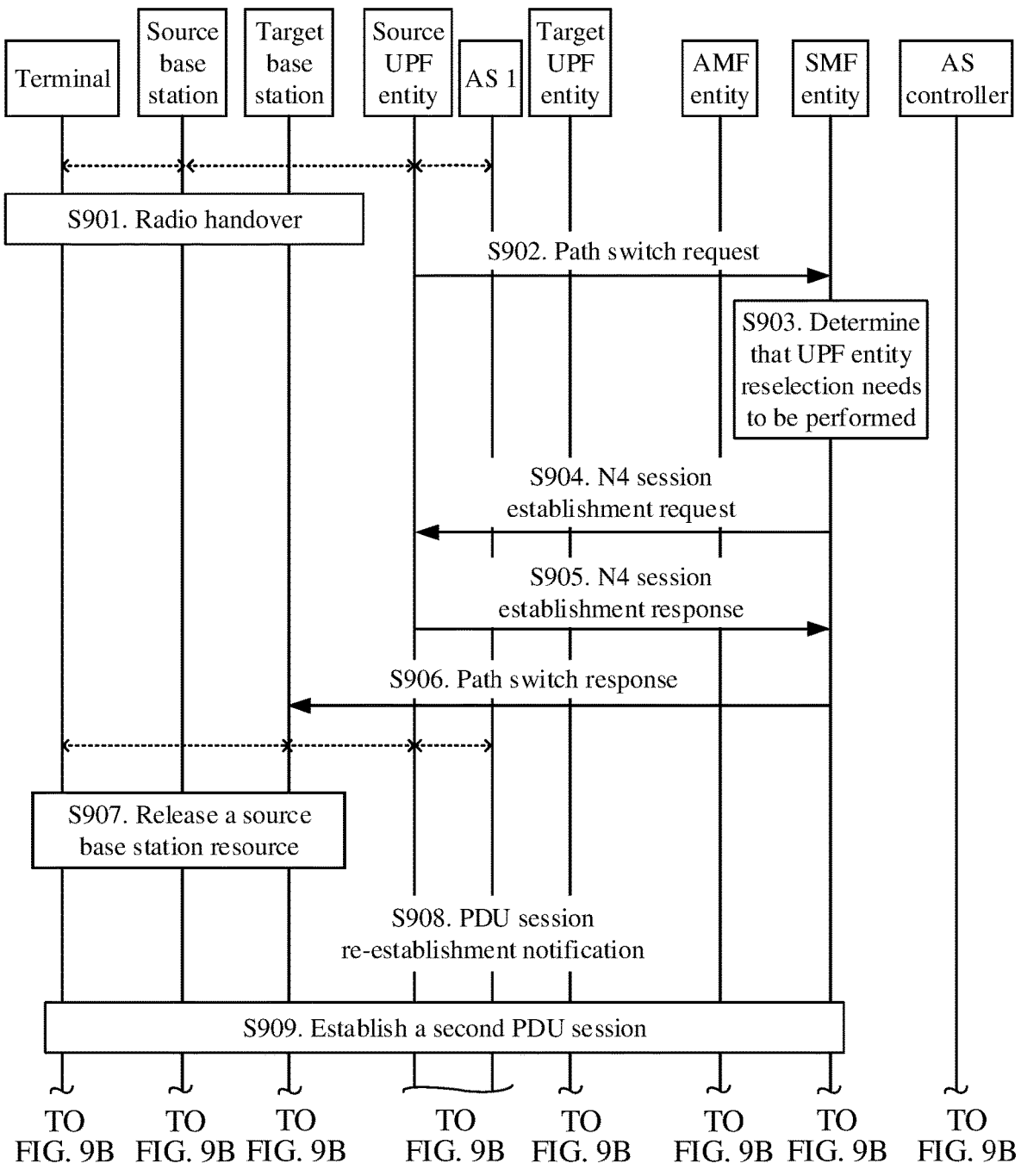
FIG. 9A and FIG. 9B are fifth schematic flowcharts of a service continuity implementation method according to an embodiment of this application.
Figure 9B:
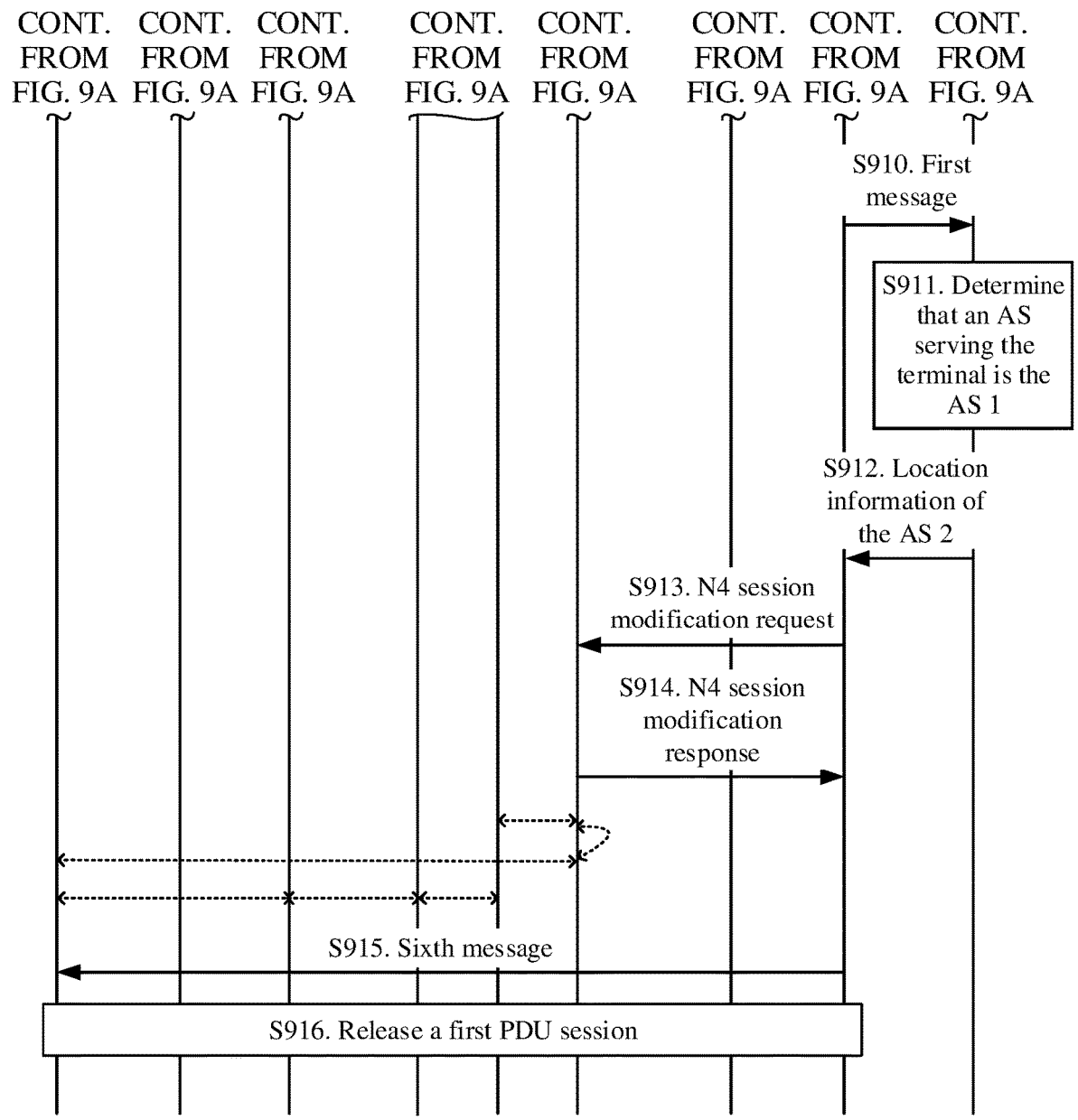

Optionally, it is assumed that in an initial state, a terminal communicates with an AS 1 using an access device (assumed to be a source base station herein) and a UPF entity 2 (referred to as a source UPF entity herein). FIG. 9A and FIG. 9B are a schematic flowchart of a service continuity implementation method according to an embodiment of this application. Interactions between the terminal, the source base station, a target base station, the source UPF entity, a UPF entity 1 (referred to as a target UPF entity herein), an AMF entity, an SMF entity, an AS controller, and the AS 1 are involved, and the following steps are included.

Steps S901 to S910 are the same as steps S801 to S810. For details, refer to the embodiment shown in FIG. 8A and FIG. 8B. Details are not described herein again.

S911. The AS controller determines, based on the first message, that the AS serving the terminal is the AS 1.

Optionally, the AS controller may determine, based on at least one of the location information of the target UPF entity or the location information of the terminal included in the first message, that the AS serving the terminal is the AS 1.

S912. The AS controller sends indication information of the AS 1 to the SMF entity, such that the SMF entity receives the indication information of the AS 1 from the AS controller.

Optionally, the indication information of the AS 1 may be location information of the AS 1, identifier information of the AS 1, information indicating that the AS 1 does not change, or the like. This is not specifically limited in this embodiment of this application.

After receiving the indication information of the AS 1 from the AS controller, the SMF entity may determine, based on the indication information of the AS 1, that a handover of the AS does not occur. For example, if the indication information of the AS 1 is the location information of the AS 1, the location information of the AS 1 may be compared with location information of a current AS; and if the location information of the AS 1 is the same as the location information of the current AS, it is determined that the handover of the AS does not occur.

S913. The SMF entity sends an N4 session modification request to the target UPF entity, such that the target UPF entity receives the N4 session modification request from the SMF entity.

The N4 session modification request includes a first routing rule. The first routing rule includes that data whose destination address is an address of the AS 1 is sent to the AS 1.

S914. The target UPF entity sends an N4 session modification response to the SMF entity, such that the SMF entity receives the N4 session modification response from the target UPF entity, where the N4 session modification response is used to indicate that establishment of a bottom-layer network pipeline between the terminal and the AS 2 is completed.

Currently, there are two sessions: the first PDU session and the second PDU session. Therefore, currently, corresponding service transmission paths are:

the terminal <-> the target base station <-> the source UPF entity <-> the AS 1, and the terminal <-> the target base station <-> the target UPF entity <-> the AS 2.

S915. The SMF entity sends a sixth message to the terminal, such that the terminal receives the sixth message from the SMF entity, where the sixth message is used to instruct the terminal to release the first PDU session.

S916. The terminal releases the first PDU session based on the sixth message.

For a procedure of releasing the first PDU session by the terminal, refer to other approaches. Details are not described herein.

According to the service continuity implementation method provided in this embodiment of this application, in one aspect, after the SMF entity selects the target UPF entity to serve the terminal, the SMF entity may receive the indication information of the AS 1, and send the first routing rule to the target UPF entity based on the indication information of the AS 1, such that the target UPF entity can transmit service data according to the first routing rule. In addition, before the AS controller determines whether the handover of the AS occurs, the SMF entity may continue to maintain a service connection between the terminal and the AS 1. Therefore, seamless service data handover can be implemented in a scenario in which a handover of the UPF entity occurs, to ensure service continuity in a handover process. In another aspect, the first routing rule is that the data whose destination address is the AS 1 is sent to the AS 1. This can prevent the target UPF entity from routing the data that is to be sent to the address of the AS 1 first to a remote DN and then to the AS 1. Therefore, a path from the terminal to the AS 1 is shortest, and latency is controllable.

The actions of the SMF entity in steps S903, S904, S906, S908, S909, S910, S913, S915, and S916 may be performed by the processor 401 in the communications device 400 shown in FIG. 4 by invoking the application program code stored in the memory 403. This is not limited in this embodiment of this application.

The actions of the AS controller in steps S911 and S912 may be performed by the processor 401 in the communications device 400 shown in FIG. 4 by invoking the application program code stored in the memory 403. This is not limited in this embodiment of this application.

The foregoing mainly describes, from a perspective of interactions between network elements, the solutions provided in the embodiments of this application. It may be understood that, to implement the foregoing functions, the session management function entity and the control device include corresponding hardware structures and/or software modules for performing the functions. A person of ordinary skill in the art should be aware that, in combination with the examples described in the embodiments disclosed in this specification, units and algorithm steps may be implemented using hardware or a combination of hardware and computer software. Whether a function is performed using hardware or hardware driven by computer software depends on particular applications and design constraints of the technical solutions. A person skilled in the art may use different methods to implement the functions for each particular application, but it should not be considered that the implementation goes beyond the scope of this application.

In the embodiments of this application, the session management function entity and the control device may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, module division is an example, and is merely logical function division. During actual implementation, another division manner may be used.

Figure 10:
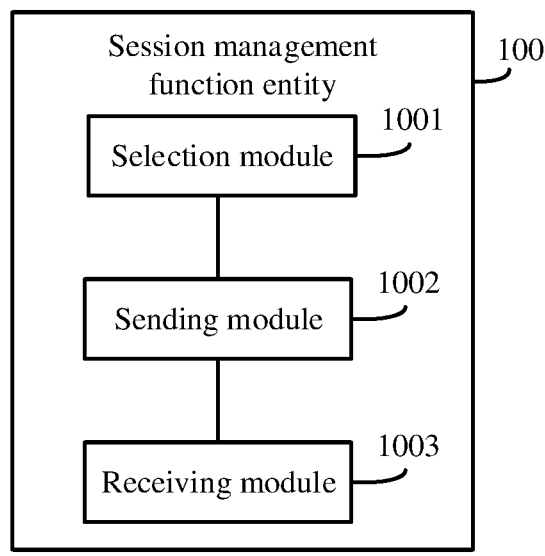
FIG. 10 is a first schematic structural diagram of a session management function entity according to an embodiment of this application.

For example, when each function module is obtained through division based on each corresponding function, FIG. 10 is a possible schematic structural diagram of the session management function entity 100 in the foregoing embodiments. The session management function entity 100 includes a selection module 1001, a sending module 1002, and a receiving module 1003. The selection module 1001 is configured to select a target user plane function entity to serve a terminal. The sending module 1002 is configured to send a first message to a control device. The receiving module 1003 is configured to receive indication information of a first AS from the control device. The sending module 1002 is further configured to send a first routing rule to the target user plane function entity based on the indication information of the first AS. The first routing rule includes that data whose destination address is an address of the first AS is sent to the first AS.

Optionally, the sending module 1002 is further configured to send a second routing rule to the target user plane function entity after the selection module 1001 selects the target user plane function entity to serve the terminal and before the first routing rule is sent to the target user plane function entity. The second routing rule includes that data whose destination address is an address of a second AS is sent to a source user plane function entity, the second AS is an AS currently serving the terminal, and the source user plane function entity is a user plane function entity communicatively connected to the second AS.

Optionally, the sending module 1002 is further configured to send first path information to the target user plane function entity after the selection module 1001 selects the target user plane function entity to serve the terminal; and the sending module 1002 is further configured to send second path information to the source user plane function entity after the selection module 1001 selects the target user plane function entity to serve the terminal. The first path information and the second path information are used to establish a forwarding path between the target user plane function entity and the source user plane function entity.

Optionally, the sending module 1002 is further configured to send a third routing rule to the target user plane function entity after the selection module 1001 selects the target user plane function entity to serve the terminal. The third routing rule includes that data whose destination address is an address of a first data network is sent to a remote user plane function entity, and the remote user plane function entity is a user plane function entity communicatively connected to the first data network.

Optionally, the sending module 1002 is further configured to send third path information to the target user plane function entity after the selection module 1001 selects the target user plane function entity to serve the terminal; and the sending module 1002 is further configured to send fourth path information to the remote user plane function entity after the selection module 1001 selects the target user plane function entity to serve the terminal. The third path information and the fourth path information are used to establish a forwarding path between the target user plane function entity and the remote user plane function entity.

Optionally, the sending module 1002 is further configured to send a second message to the target user plane function entity after sending the first routing rule to the target user plane function entity. The second message is used to request to delete the second routing rule.

Optionally, the sending module 1002 is further configured to send a third message to the target user plane function entity after sending the first routing rule to the target user plane function entity. The third message is used to request to delete the first path information.

Optionally, the sending module 1002 is further configured to send a fourth message to the source user plane function entity after sending the first routing rule to the target user plane function entity. The fourth message is used to request to delete user plane information, corresponding to the terminal, on the source user plane function entity, and the user plane information includes the second path information.

Optionally, the sending module 1002 is further configured to send fifth path information to a target base station before the selection module 1001 selects the target user plane function entity to serve the terminal; and the sending module 1002 is further configured to send sixth path information to the source user plane function entity before the selection module 1001 selects the target user plane function entity to serve the terminal. The fifth path information and the sixth path information are used to establish a forwarding path between the target base station and the source user plane function entity, the source user plane function entity is a user plane function entity currently establishing a first PDU session with the terminal, and the target base station is a base station currently communicatively connected to the target user plane function entity.

Optionally, the selection module 1001 is configured to: send a fifth message to the terminal, where the fifth message is used to request to establish a second PDU session; and select, in a process of establishing the second PDU session, the target user plane function entity to serve the terminal.

Optionally, the sending module 1002 is configured to send a sixth message to the terminal after sending the first routing rule to the target user plane function entity. The sixth message is used to request to release the first PDU session.

Optionally, the sending module 1002 is further configured to send a seventh message to the control device after sending the first routing rule to the target user plane function entity. The seventh message is used to request to switch the terminal from the second AS to the first AS, and the second AS is the AS currently serving the terminal.

Optionally, the receiving module 1003 is further configured to receive an eighth message from the control device after the sending module 1002 sends the seventh message to the control device. The eighth message is used to indicate that the terminal has been switched from the second AS to the first AS.

All related content of steps in the foregoing method embodiments may be cited in function descriptions of corresponding function modules, and details are not described herein again.

Figure 11:
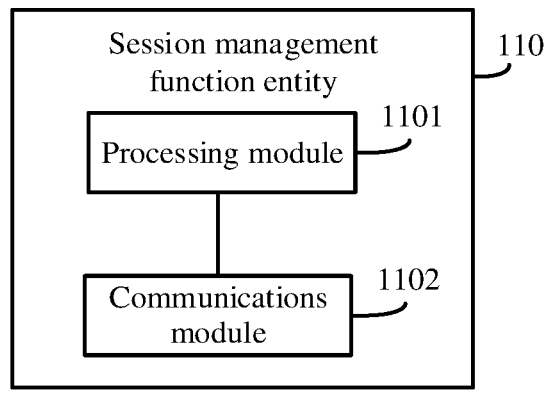
FIG. 11 is a second schematic structural diagram of a session management function entity according to an embodiment of this application.

When each function module is obtained through division in an integrated manner, FIG. 11 is a possible schematic structural diagram of the session management function entity 110 in the foregoing embodiments. The session management function entity 110 includes a processing module 1101 and a communications module 1102. The processing module 1101 may be configured to perform an operation that can be performed by the selection module 1001 in FIG. 10. The communications module 1102 may be configured to perform operations that can be performed by the receiving module 1003 and the sending module 1002 in FIG. 10. For details, refer to the embodiment shown in FIG. 10. Details are not described again in this embodiment of this application.

All related content of steps in the foregoing method embodiments may be cited in function descriptions of corresponding function modules, and details are not described herein again.

In this embodiment, the session management function entity is presented in a form in which each function module is obtained through division based on each corresponding function, or the session management function entity is presented in a form in which each function module is obtained through division in an integrated manner. The "module" herein may be an application-specific integrated circuit (ASIC), a circuit, a processor and a memory that execute one or more software programs or firmware programs, an integrated logic circuit, and/or another component that can provide the foregoing function. In an embodiment, a person skilled in the art may appreciate that the session management function entity 100 or the session management function entity 110 may be in a form shown in FIG. 4. For example, the selection module 1001, the sending module 1002, and the receiving module 1003 in FIG. 10 may be implemented using the processor 401 and the memory 403 in FIG. 4. The selection module 1001, the sending module 1002, and the receiving module 1003 may be implemented using the processor 401 by invoking the application program code stored in the memory 403. This is not limited in this embodiment of this application. Alternatively, for example, the processing module 1101 and the communications module 1102 in FIG. 11 may be implemented using the processor 401 and the memory 403 in FIG. 4. The processing module 1101 and the communications module 1102 may be implemented using the processor 401 by invoking the application program code stored in the memory 403. This is not limited in this embodiment of this application.

The session management function entity provided in this embodiment of this application may be configured to perform the service continuity implementation method. Therefore, for a technical effect that can be obtained by the session management function entity, refer to the foregoing method embodiments. Details are not described herein again.

Figure 12:
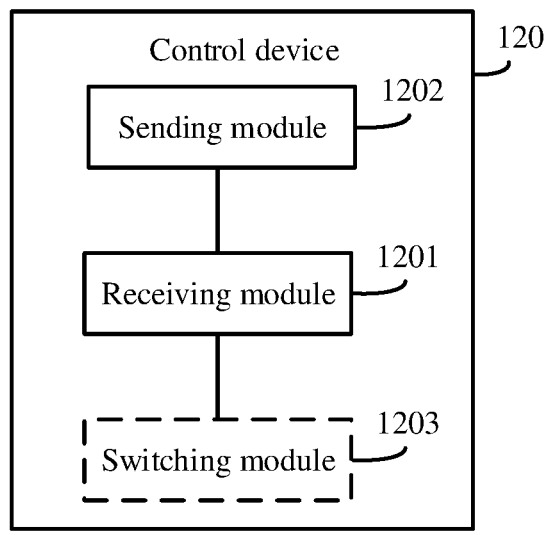
FIG. 12 is a first schematic structural diagram of a control device according to an embodiment of this application.

For example, when each function module is obtained through division based on each corresponding function, FIG. 12 is a possible schematic structural diagram of the control device in the foregoing embodiments. The control device 120 includes a receiving module 1201 and a sending module 1202. The receiving module 1201 is configured to receive a first message from a session management function entity. The sending module 1202 is configured to send indication information of a first AS to the session management function entity. The indication information of the first AS is used to instruct the session management function entity to send a first routing rule to a target user plane function entity, and the first routing rule includes that data whose destination address is an address of the first AS is sent to the first AS.

Optionally, as shown in FIG. 12, the control device 120 further includes a switching module 1203. The receiving module 1201 is further configured to receive a seventh message from the session management function entity after the sending module 1202 sends the indication information of the first AS to the session management function entity. The seventh message is used to instruct to switch a terminal from a second AS to the first AS, and the second AS is an AS currently serving the terminal. The switching module 1203 is configured to switch the terminal from the second AS to the first AS based on the seventh message.

All related content of steps in the foregoing method embodiments may be cited in function descriptions of corresponding function modules, and details are not described herein again.

Figure 13:
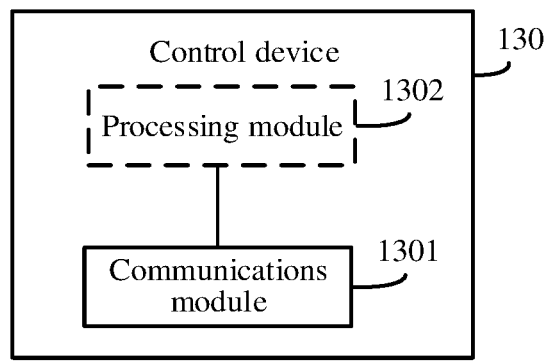
FIG. 13 is a second schematic structural diagram of a control device according to an embodiment of this application.

When each function module is obtained through division in an integrated manner, FIG. 13 is a possible schematic structural diagram of the control device 130 in the foregoing embodiments. The control device 130 includes a communications module 1301. The communications module 1301 may be configured to perform operations that can be performed by the receiving module 1201 and the sending module 1202 in FIG. 12. For details, refer to the embodiment shown in FIG. 12. Details are not described again in this embodiment of this application.

Optionally, as shown in FIG. 13, the control device 130 provided in this embodiment of this application may further include a processing module 1302. The processing module 1302 may be configured to perform an operation that can be performed by the switching module 1203 in FIG. 12. For details, refer to the embodiment shown in FIG. 12. Details are not described again in this embodiment of this application.

All related content of steps in the foregoing method embodiments may be cited in function descriptions of corresponding function modules, and details are not described herein again.

In this embodiment, the control device is presented in a form in which each function module is obtained through division based on each corresponding function, or the control device is presented in a form in which each function module is obtained through division in an integrated manner. The "module" herein may be an application-specific integrated circuit (ASIC), a circuit, a processor and a memory that execute one or more software programs or firmware programs, an integrated logic circuit, and/or another component that can provide the foregoing function. In a simple embodiment, a person skilled in the art may appreciate that the control device 120 or the control device 130 may be in a form shown in FIG. 4. For example, the receiving module 1201, the sending module 1202, and the switching module 1203 in FIG. 12 may be implemented using the processor 401 and the memory 403 in FIG. 4. The receiving module 1201, the sending module 1202, and the switching module 1203 may be implemented using the processor 401 by invoking the application program code stored in the memory 403. This is not limited in this embodiment of this application. Alternatively, for example, the processing module 1302 and the communications module 1301 in FIG. 13 may be implemented using the processor 401 and the memory 403 in FIG. 4. The processing module 1302 and the communications module 1301 may be implemented using the processor 401 by invoking the application program code stored in the memory 403. This is not limited in this embodiment of this application.

The control device provided in this embodiment of this application may be configured to perform the service continuity implementation method. Therefore, for a technical effect that can be obtained by the control device, refer to the foregoing method embodiments. Details are not described herein again.

All or some of the foregoing embodiments may be implemented using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to example features and the embodiments thereof, various modifications and combinations may be made to the features and the embodiments without departing from the spirit and scope of this application. Correspondingly, the specification and accompanying drawings are merely example descriptions of this application defined by the accompanying claims, and are considered as any of or all modifications, variations, combinations or equivalents that cover the scope of this application. A person skilled in the art can make various modifications and variations to this application without departing from the spirit and scope of this application. This application is intended to cover these modifications and variations of this application provided that these modifications and variations fall within the scope of protection defined by the following claims and their equivalent technologies.

What is claimed is:

1. A service continuity implementation method, comprising:
    selecting, by a session management function entity, a target user plane function entity to serve a terminal;
    sending, by the session management function entity, first path information to the target user plane function entity;
    sending, by the session management function entity, second path information to a source user plane function entity, wherein the first path information and the second path information are for establishing a forwarding path between the target user plane function entity and the source user plane function entity;
    sending, by the session management function entity, a first message to a control device;
    receiving, by the session management function entity, indication information of a first application server (AS) from the control device; and
    sending, by the session management function entity, a first routing rule to the target user plane function entity based on the indication information of the first AS, wherein the first routing rule specifies that data whose destination address is an address of the first AS is to be sent to the first AS.

2. The service continuity implementation method according to claim 1, after selecting the target user plane function entity to serve the terminal, and before sending the first routing rule to the target user plane function entity, the service continuity implementation method further comprises sending, by the session management function entity, a second routing rule to the target user plane function entity, wherein the second routing rule specifies that data whose destination address is an address of a second AS is to be sent to a source user plane function entity, wherein the second AS is an AS currently serving the terminal, and wherein the source user plane function entity is a user plane function entity communicatively connected to the second AS.

3. The service continuity implementation method according to claim 2, after sending the first routing rule to the target user plane function entity, the service continuity implementation method further comprises sending, by the session management function entity, a second message to the target user plane function entity, wherein the second message requests deletion of the second routing rule.

4. The service continuity implementation method according to claim 1, further comprising:
    receiving, by the control device, the first message from the session management function entity; and
    sending, by the control device, the indication information of the first AS to the session management function entity.

5. The service continuity implementation method according to claim 1, further comprising:
    receiving, by the control device, a seventh message from the session management function entity, wherein the seventh message instructs switching the terminal from a second AS to the first AS, and wherein the second AS is an AS currently serving the terminal; and
    switching, by the control device, the terminal from the second AS to the first AS based on the seventh message.

6. The service continuity implementation method according to claim 1, wherein the first message comprises of location information of the target user plane function entity, and wherein of the location information of the target user plane function entity is for determining that an AS serving the terminal is the first AS.

7. The service continuity implementation method according to claim 1, wherein the indication information of the first AS comprises location information of the first AS.

8. A session management function entity, comprising:
    at least one processor; and
    a memory storing computer-executable instructions that, when executed by the at least one processor, instruct the at least one processor to:
        select a target user plane function entity to serve a terminal;
        send first path information to the target user plane function entity;
        send second path information to a source user plane function entity, wherein the first path information and the second path information are for establishing a forwarding path between the target user plane function entity and the source user plane function entity;
        send a first message to a control device;
        receive indication information of a first application server (AS) from the control device; and
        send a first routing rule to the target user plane function entity based on the indication information of the first AS, wherein the first routing rule specifies that data whose destination address is an address of the first AS is to be sent to the first AS.

9. The session management function entity according to claim 8, wherein the computer-executable instructions, when executed, further instruct the at least one processor to send a second routing rule to the target user plane function entity after the at least one processor selects the target user plane function entity to serve the terminal and before the first routing rule is sent to the target user plane function entity, wherein the second routing rule specifies that data whose destination address is an address of a second AS is to be sent to a source user plane function entity, wherein the second AS is an AS currently serving the terminal, and wherein the source user plane function entity is a user plane function entity communicatively connected to the second AS.

10. The session management function entity according to claim 9, wherein the computer-executable instructions, when executed, further instruct the at least one processor to send a second message to the target user plane function entity after sending the first routing rule to the target user plane function entity, wherein the second message requests to delete the second routing rule.

11. The session management function entity according to claim 8, wherein the computer-executable instructions, when executed, further instruct the at least one processor to send a seventh message to the control device after sending the first routing rule to the target user plane function entity, wherein the seventh message requests switching the terminal from a second AS to the first AS, and wherein the second AS is an AS currently serving the terminal.

12. The session management function entity according to claim 11, wherein the computer-executable instructions, when executed, further instruct the at least one processor to receive an eighth message from the control device after sending the seventh message to the control device, wherein the eighth message indicates that the terminal has been switched from the second AS to the first AS.

13. A service continuity implementation system, comprising:
  a session management function entity configured to:
    select a target user plane function entity to serve a terminal;
    send first path information to the target user plane function entity;
    send second path information to a source user plane function entity, wherein the first path information and the second path information are used to establish a forwarding path between the target user plane function entity and the source user plane function entity; and
    send a first message to a controller; and
  the controller, wherein the controller configured to send indication information of a first application server (AS),
  wherein the session management function entity is further configured to:
    receive the indication information of the first AS; and
    send a first routing rule to the target user plane function entity based on the indication information of the first AS,
    wherein the first routing rule specifies that data whose destination address is an address of the first AS is to be sent to the first AS.

14. The service continuity implementation system according to claim 13, wherein the session management function entity is further configured to send a second routing rule to the target user plane function entity, wherein the second routing rule specifies that data whose destination address is an address of a second AS is to be sent to a source user plane function entity, wherein the second AS is an AS currently serving the terminal, and wherein the source user plane function entity is a user plane function entity communicatively connected to the second AS.

15. The service continuity implementation system according to claim 14, wherein the session management function entity is further configured to send a second message to the target user plane function entity, wherein the second message requests to delete the second routing rule.

16. The service continuity implementation system according to claim 13, wherein the session management function entity is further configured to send a seventh message to the controller, wherein the seventh message requests the controller to switch the terminal from a second AS to the first AS, wherein the second AS is an AS currently serving the terminal, and wherein the controller is further configured to:
  receive the seventh message from the session management function entity; and
  switch the terminal from the second AS to the first AS.

17. The service continuity implementation system according to claim 16, wherein the controller is further configured to send an eighth message to the session management function entity, wherein the eighth message indicates to the session management function entity that the terminal has been switched from the second AS to the first AS, and wherein the session management function entity is further configured to receive the eighth message from the controller.

18. The session management function entity according to claim 8, wherein the first message comprises location information of the target user plane function entity, and wherein the location information of the target user plane function entity is for determining that an AS serving the terminal is the first AS.

19. The service continuity implementation system according to claim 13, wherein the first message comprises location information of the target user plane function entity, and wherein the location information of the target user plane function entity is for determining that an AS serving the terminal is the first AS.

\* \* \* \* \*

UNITED STATES PATENT AND TRADEMARK OFFICE
CERTIFICATE OF CORRECTION

Page 1 of 1

PATENT NO. : 11,115,876 B2
APPLICATION NO. : 16/716049
DATED : September 7, 2021
INVENTOR(S) : Dekui Sun and Han Zhou It is certified that error appears in the above-identified patent and that said Letters Patent is hereby corrected as shown below:

In the Claims

Claim 6, Column 40, Line 37: "message comprises of" should read "message comprises"

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*